United States Patent
Jang et al.

(10) Patent No.: US 9,467,634 B2
(45) Date of Patent: Oct. 11, 2016

(54) IMAGE SENSOR FOR COMPENSATING COLUMN MISMATCH AND METHOD OF PROCESSING IMAGE USING THE SAME

(71) Applicant: SAMSUNG ELECTRONICS CO., LTD., Suwon-si, Gyeonggi-do (KR)

(72) Inventors: Young Tae Jang, Pyeongtaek-si (KR); Ju Hyun Ko, Seongnam-si (KR); Kwang June Sohn, Seongnam-si (KR); Jin Woo Kim, Seoul (KR); Min Woo Son, Yongin-si (KR); Won Joon Hong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 6 days.

(21) Appl. No.: 14/246,294

(22) Filed: Apr. 7, 2014

(65) Prior Publication Data

US 2014/0313382 A1 Oct. 23, 2014

(30) Foreign Application Priority Data

Apr. 23, 2013 (KR) ........................ 10-2013-0044977

(51) Int. Cl.
| | | |
|---|---|---|
| *H04N 5/225* | (2006.01) | |
| *H04N 5/357* | (2011.01) | |
| *H04N 5/365* | (2011.01) | |
| *H04N 5/378* | (2011.01) | |

(52) U.S. Cl.
CPC ............ *H04N 5/3575* (2013.01); *H04N 5/365* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 6,903,670 B1* | 6/2005 | Lee et al. ...................... 341/118 |
| 7,746,400 B2* | 6/2010 | Mo ............... 348/308 |
| 8,045,032 B2* | 10/2011 | Muroshima et al. ......... 348/308 |
| 2002/0051067 A1* | 5/2002 | Henderson et al. .......... 348/241 |
| 2004/0189836 A1* | 9/2004 | Spears et al. ................. 348/241 |
| 2005/0237407 A1 | 10/2005 | Bae |
| 2005/0269609 A1 | 12/2005 | Henderson |
| 2006/0262210 A1* | 11/2006 | Smith .................. H04N 5/3651 348/308 |
| 2008/0193076 A1 | 8/2008 | Witzens et al. |
| 2009/0237545 A1 | 9/2009 | Nakamura et al. |
| 2009/0278963 A1 | 11/2009 | Shah et al. |
| 2009/0279809 A1 | 11/2009 | Richardson |
| 2009/0322911 A1* | 12/2009 | Blanquart ..................... 348/241 |
| 2010/0085438 A1* | 4/2010 | Richardson ............ H04N 5/361 348/222.1 |
| 2010/0110254 A1 | 5/2010 | Mo et al. |
| 2011/0317036 A1 | 12/2011 | Lim |

FOREIGN PATENT DOCUMENTS

| | | |
|---|---|---|
| KR | 10-2011-0079016 A | 7/2011 |
| KR | 10-2012-0017709 A | 2/2012 |

* cited by examiner

*Primary Examiner* — Twyler Haskins
*Assistant Examiner* — Dwight C Tejano
(74) *Attorney, Agent, or Firm* — Lee & Morse, P.C.

(57) ABSTRACT

An image sensor includes a pixel array, a column signal processor, and a column mismatch compensator. The pixel array outputs a pixel signal from each column line during a pixel measuring time, and outputs a reference signal during a reference measuring time. The column signal processor performs correlated double sampling (CDS) on the reference signal to generate a reference CDS signal, and performs CDS on the pixel signal to generate a pixel CDS signal. The column mismatch compensator compensates the pixel CDS signal based on the reference CDS signal.

14 Claims, 22 Drawing Sheets

IMAGE SENSOR FOR COMPENSATING COLUMN MISMATCH AND METHOD OF PROCESSING IMAGE USING THE SAME

CROSS-REFERENCE TO RELATED APPLICATION

Korean Patent Application No. 10-2013-0044977, filed on Apr. 23, 2013, and entitled, "Image Sensor For Compensating For Column Mismatch and Method Of Processing Image Using The Same," is incorporated by reference herein in its entirety.

BACKGROUND

1. Field

One or more embodiments described herein relate to an image sensor.

2. Description of the Related Art

An image sensor captures an image using the properties of a semiconductor reacting to light. A complementary metal oxide semiconductor (CMOS) image sensor has proven to consume less power than a charge coupled device (CCD) image sensor. Accordingly, CMOS image sensors are used in portable phones, digital cameras, and other battery powered devices.

A CMOS image sensor may include a pixel array and a column parallel analog-to-digital converter (ADC). In devices of this type, an offset or mismatch may occur as a result of differences in physical characteristics between the pixels and the ADC. The offset may increase when the ADC includes a sample-and-hold circuit.

An offset occurring in a pixel may be reduced using correlated double sampling (CDS), which provides an indication of the difference between a pixel signal and a reset signal output from the pixel. However, it is difficult to reduce a column offset occurring in a circuit (e.g., the ADC) outside the pixel array using CDS. The column offset appears as column-fixed pattern noise (CFPN) in an image.

In order to reduce column offset, a fixed voltage may be selectively applied to the ADC. Then, CFPN in an output of the ADC may be measured. At this time, however, additional hardware for applying the fixed voltage is required.

SUMMARY

In accordance with one or more embodiments, an image sensor includes a pixel array configured to output a pixel signal from each column line during a pixel measuring time, and to output a reference signal during a reference measuring time different from the pixel measuring time; a column signal processing unit configured to perform correlated double sampling (CDS) on the reference signal to generate a reference CDS signal, and to perform CDS on the pixel signal to generate a pixel CDS signal; and a column mismatch compensator configured to compensate the pixel CDS signal based on the reference CDS signal. The reference signal may correspond to the pixel signal generated when the pixel array does not receive light.

The image sensor may include a sample-and-hold circuit configured to receive the reference signal and the pixel signal from the pixel array, and to sample and transmit the reference signal and the pixel signal to the column signal processing unit. Each of at least one pixel row in the pixel array may include a plurality of pixels controlled by a transfer signal, a reset signal, and a selection signal.

Each of the may pixels include a photodiode configured to receive light and generate photocharges; a transfer transistor to transfer the photocharges based on the transfer signal; a floating diffusion node configured to accumulate the photocharges transferred through the transfer transistor; a reset transistor configured to discharge the photocharges from the floating diffusion node based on the reset signal; a source follower transistor configured to amplify and convert the photocharges in the floating diffusion node into a voltage signal; and a selection transistor configured to selectively output the voltage signal based on the selection signal.

The reset signal and selection signal may be simultaneously activated during the reference measuring time. The transfer signal may be deactivated while the selection signal is activated during the reference measuring time. The reference signal may be output from at least one first pixel row in the pixel array, and the pixel signal may be output from a plurality of second pixel rows different from the first pixel row in the pixel array.

At least one first pixel row may output the reference signal for each frame. The at least one first pixel row may output the reference signal at a same time. The reference signal and the pixel signal may be output from same pixel rows in the pixel array.

The column mismatch compensator may comprise a first block configured to generate reference column fixed pattern noise (CFPN) data based on the reference CDS signal, and to generate pixel data based on the pixel CDS signal; a second block configured to store the reference CFPN data or the pixel data; and a third block configured to compensate the pixel data based on the reference CFPN data. The third block may output compensation data based on a difference between the pixel data and the reference CFPN data.

In accordance with another embodiment, a method of processing an image includes generating a reference signal from a pixel array during a reference measuring time; generating a reference correlated double sampling (CDS) signal by performing CDS on the reference signal; generating a pixel signal from the pixel array during a pixel measuring time different from the reference measuring time; generating a pixel CDS signal by performing CDS on the pixel signal; and compensating the pixel CDS signal based on the reference CDS signal. The reference signal may correspond to the pixel signal generated when the pixel array does not receive light.

The method may further include controlling a plurality of pixels in each of at least one pixel row based on a transfer signal, a reset signal, and a selection signal. Each of the pixels may include a photodiode configured to receive light and generate photocharges; a transfer transistor connected to the photodiode to transfer the photocharges based on the transfer signal; a floating diffusion node configured to accumulate the photocharges transferred through the transfer transistor; a reset transistor configured to discharge the photocharges from the floating diffusion node based on the reset signal; a source follower transistor configured to amplify and convert the photocharges in the floating diffusion node into a voltage signal; and a selection transistor configured to selectively output the voltage signal based on the selection signal, and the reset signal and the selection signal are simultaneously activated during the reference measuring time.

In accordance with another embodiment, an image sensor may include a pixel array to output a reference signal; and a compensator to reduce column fixed pattern noise in an image generated by the pixel array based on the reference signal. The image sensor may further include a processor to perform correlated double sampling (CDS) on the reference signal to generate a reference CDS signal, and to perform CDS on a pixel signal from at least one column line in the pixel array to generate a pixel CDS signal, wherein the compensator is to compensate the pixel CDS signal based on the reference CDS signal.

The pixel array may output the pixel signal during a pixel measuring time, and may output the reference signal during a reference measuring time different from the pixel measuring time. The reference signal may correspond to the pixel signal at a time when the pixel array does not receive light. The pixel array may output the reference signal for each frame used to drive the image sensor.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
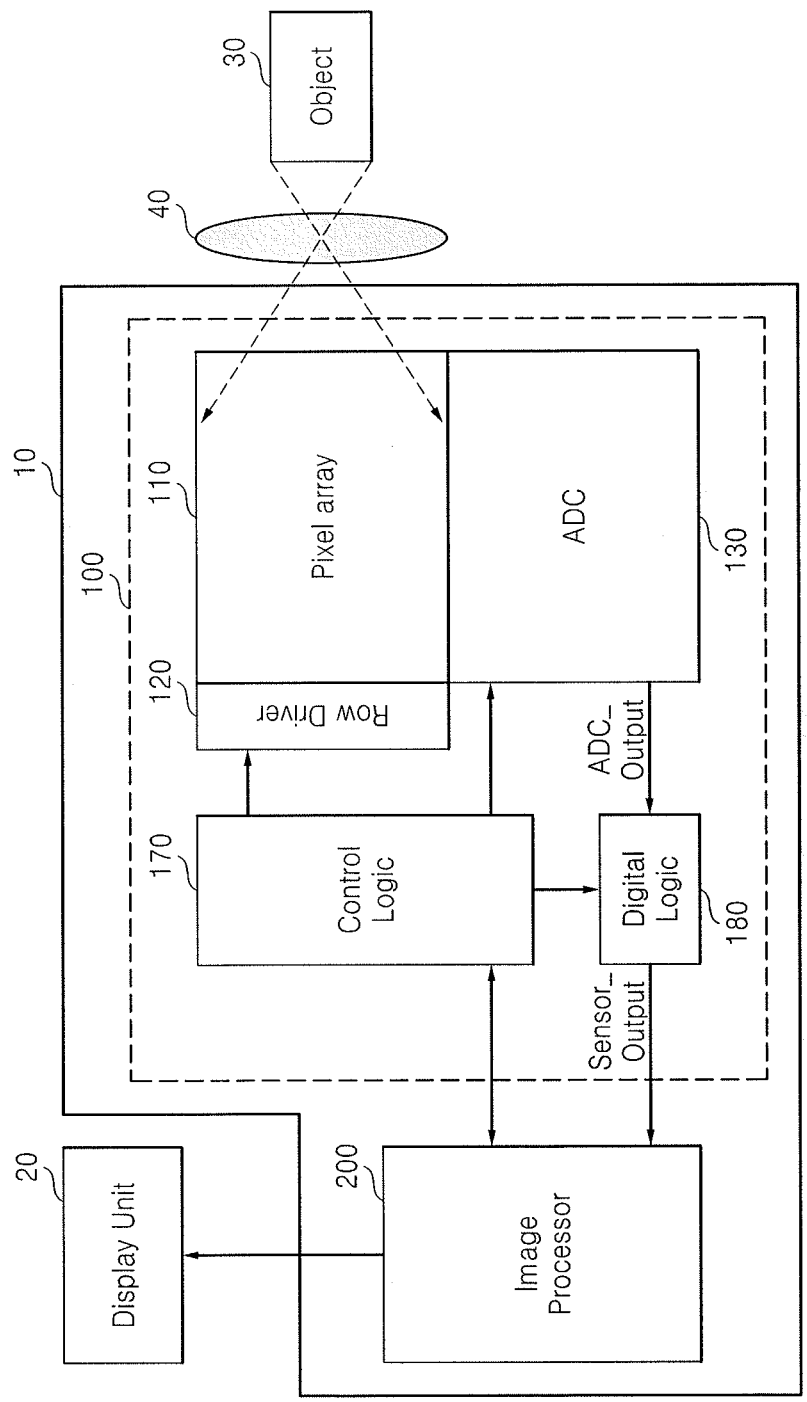
FIG. 1 illustrates an embodiment of an image processing device including an image sensor.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an image processing device 10 including an image sensor 100 and an image processor 200. The image sensor 100 may sense an object 30 picked up through a lens 40 according to control of the image processor 200. The image processor 200 may output an image sensed and output by the image sensor 100 to a display unit 20. The display unit 20 may be any device that can output an image, such as a computer, a mobile phone, or an image output terminal.

The image processor 200 may control the image sensor 100 and may process and output data Sensor_Output of the image sensor 100 to the display unit 20. The processing may be performed in the image sensor 100 instead of the image processor 200 in other embodiments. The image processor 200 may control the image sensor 100 using, for example, an inter-integrated circuit (I2C).

The image sensor 100 includes a pixel array 110, a row driver 120, an analog-to-digital converter (ADC) 130, and a control logic 170. The image sensor 100 may also include digital logic 180. The control logic 170 may control operations of the row driver 120, the ADC 130, and the digital logic 180.

Figure 2:
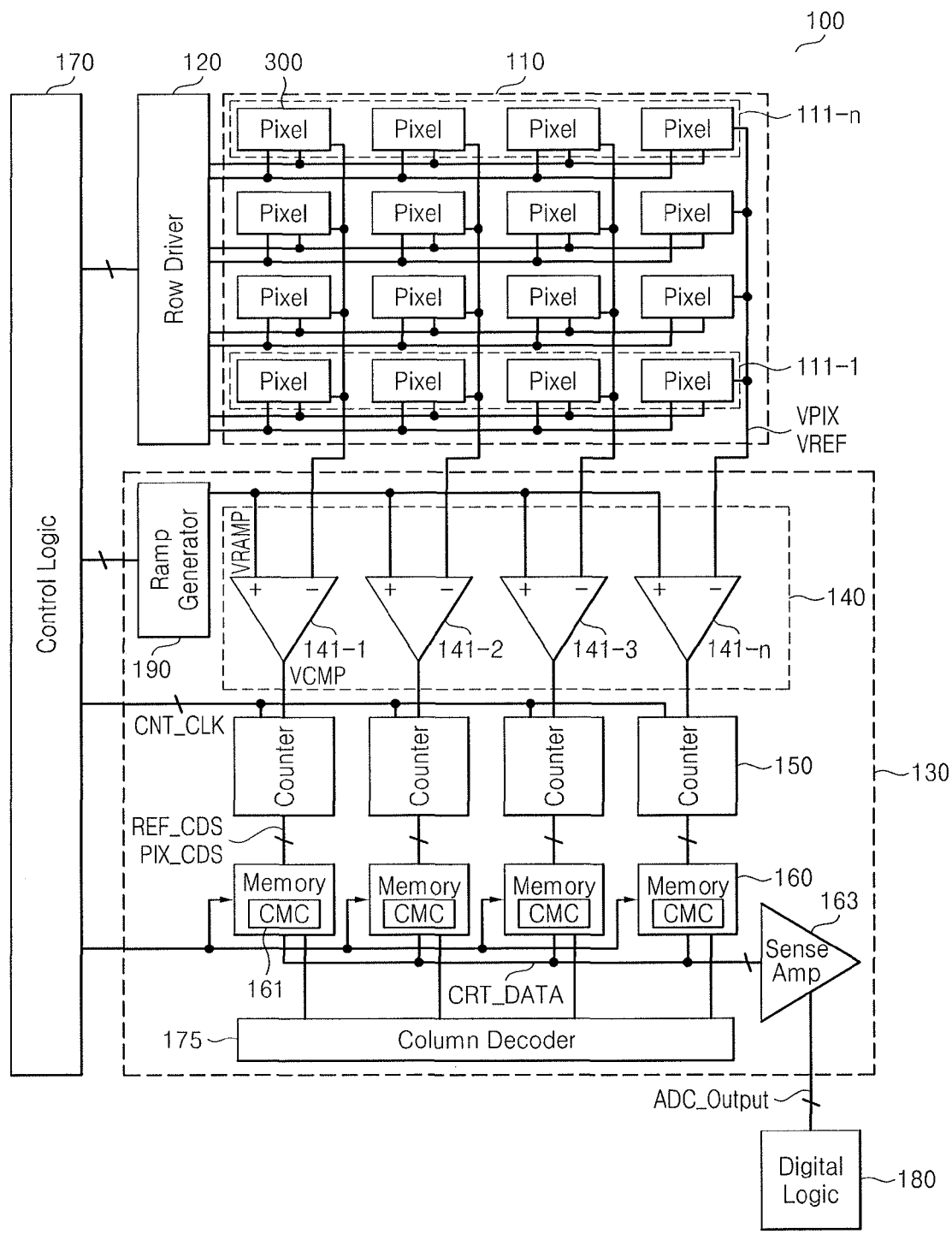
FIG. 2 illustrates an embodiment of the image sensor in FIG. 1.

FIG. 2 illustrates an embodiment of image sensor 100 in FIG. 1. Referring to FIGS. 1 and 2, pixel array 110 may include a plurality of pixel rows 111-1 through 111-$n$, where "n" is an integer of at least 2. The pixel array 110 converts an optical image signal into an electrical pixel signal using pixels 300 in pixel rows 111-1 through 111-$n$.

Each pixel 300 may be implemented as a red pixel which converts light in the red spectrum into an electrical signal, a green pixel which converts light in the green spectrum into an electrical signal, or a blue pixel which converts light in the blue spectrum into an electrical signal. In other embodiments, pixel 300 may be implemented as a cyan pixel, a magenta pixel, a yellow pixel, or another color pixel or white. The pixel 300 may be, for example, a photodiode or a pinned photodiode.

The row driver 120 drives the pixel array 110 in units of rows. For instance, the row driver 120 may generate a row selection signal. More specifically, the row driver 120 may decode a row control signal (e.g., an address signal) generated by the control logic 170 and select at least one of the pixel rows 111-1 through 111-$n$ in the pixel array 110 in response to a decoded row control signal.

The pixel array 110 outputs to the ADC 130 a pixel signal VPIX from the row selected in response to the row selection signal received from the row driver 120. The pixel signal VPIX includes a reset signal and an image signal.

A voltage difference between the reset signal and the image signal may include information about the amount of light received by the pixel 300. For instance, when pixel 300 does not receive light, the reset signal and the image signal may be the same. When the pixel 300 receives light, the voltage of the reset signal may be greater than that of the image signal. The control logic 170 may control the pixel array 110 so that at least one of the pixel rows 111-1 through 111-n outputs a reference signal VREF to the ADC 130 during a predetermined time period. The reference signal VREF may include a reset signal and an image signal that have the same voltage. The reference signal VREF may correspond to the pixel signal VPIX generated when the at least one of the pixel rows 111-1 through 111-n does not receive light.

The ADC 130 may compare the pixel signal VPIX or the reference signal VREF received from the pixel array 110 with a ramp signal VRAMP received from a ramp generator 190, count a comparison result signal, and output a count result to the digital logic 180. The ADC 130 may be a column parallel ADC. The ADC 130 includes a correlated double sampling (CDS) block 140 including a plurality of CDS circuits 141-1 through 141-n, a plurality of counters 150, a plurality of memories 160, a column decoder 175, a sense amplifier 163, and the ramp generator 190.

The ramp generator 190 may generate ramp signal VRAMP according to control of control logic 170. The ramp signal VRAMP may be ramped up or ramped down. Each CDS circuit 141-k may perform CDS on the pixel signal VPIX or the reference signal VREF, output from a pixel 300 connected to one of column lines in the pixel array 110.

The counters 150 are respectively connected to output terminals of the respective CDS circuits 141-1 through 141-n. Each of the counters 150 counts an output signal VCMP of a corresponding one of the CDS circuits 141-1 through 141-n using a clock signal CNT_CLK received from the control logic 170, and outputs a digital signal corresponding to a count result. The counter 150 may be implemented as an up/down counter or a bitwise inversion counter.

Each of the memories 160 may store a digital signal output from one of the counters 150 according to a control signal generated by the control logic 170. Each memory 160 may be implemented using static random access memory (SRAM) or dynamic RAM (DRAM). The memory 160 may include a column mismatch compensator (CMC) 161.

The digital signal output from the counter 150 may include a reference CDS signal REF_CDS and a pixel CDS signal PIX_CDS. The CMC 161 may store the reference CDS signal REF_CDS or the pixel CDS signal PIX_CDS, and output compensated data CRT_DATA obtained by compensating the pixel CDS signal PIX_CDS based on the reference CDS signal REF_CDS. The compensated data CRT_DATA is output from at least one of the memories 160 according to control of the CMC 161. The compensated data CRT_DATA is amplified by the sense amplifier 163, and is then output as an ADC output signal ADC_Output.

The digital logic 180 may generate the image sensor output signal Sensor_Output by performing digital processing on the signal ADC_Output received from the ADC 130. The image sensor may output signal Sensor_Output to the image processor 200.

Figure 3:
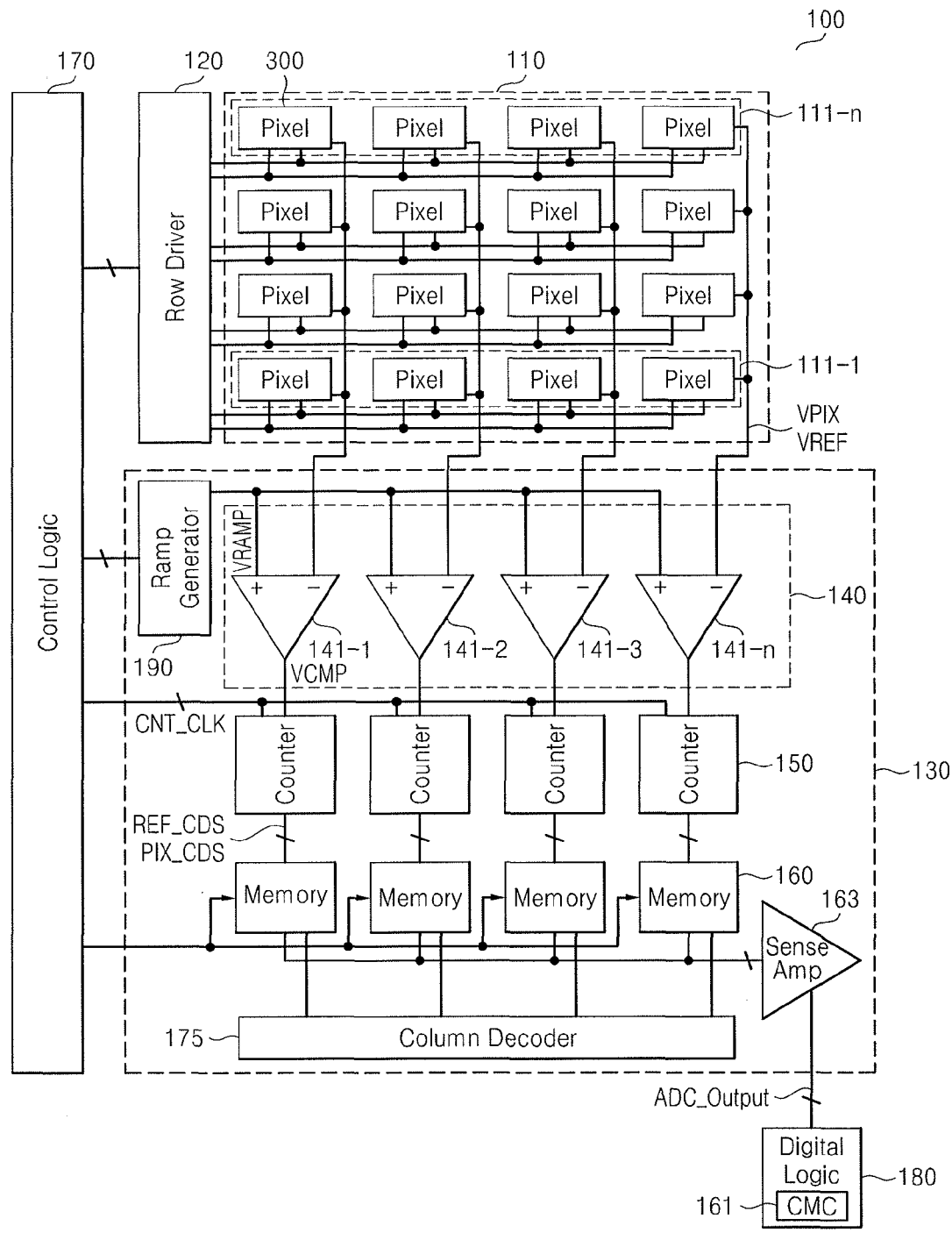
FIG. 3 illustrates another embodiment of the image sensor in FIG. 1.

FIG. 3 illustrates another embodiment of image sensor 100 in FIG. 1. Since the structure of the image sensor in FIG. 3 is almost the same as the image sensor in FIG. 2, the differences from the image sensor in FIG. 2 will be mainly described.

Referring to FIG. 3, a CMC 161 may be positioned within the digital logic 180, instead of being positioned in each of the memories 160 in the ADC 130. At this time, the ADC output signal ADC_Output may include reference CDS signal REF_CDS and the pixel CDS signal PIX_CDS. The CMC 161 may store the reference CDS signal REF_CDS or the pixel CDS signal PIX_CDS and compensate the pixel CDS signal PIX_CDS based on the reference CDS signal REF_CDS.

Figure 4:
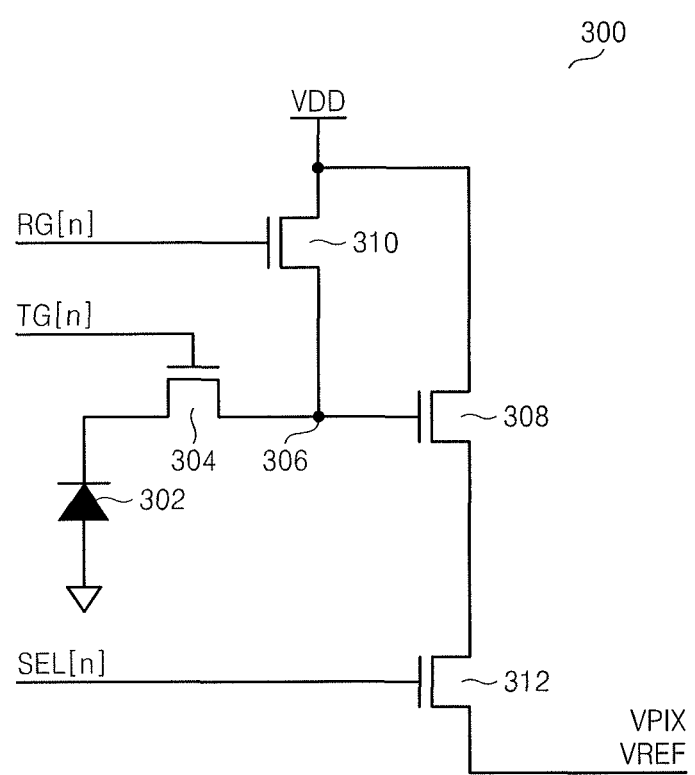
FIG. 4 illustrates an example of a pixel in FIG. 2.

FIG. 4 illustrates an embodiment of pixel 300 in FIG. 2. Referring to FIGS. 2 and 4, each of the pixel rows 111-1 through 111-n includes a plurality of pixels 300 controlled by the same transfer signal TG, the same reset signal RG, and the same selection signal SEL. For clarity of the description, a transfer signal, a reset signal, and a selection signal which are applied to the n-th pixel row 111-n will be denoted by TG[n], RG[n], and SEL[n], respectively.

Each pixel 300 may include a photodiode 302, a transfer transistor 304, a floating diffusion node 306, a reset transistor 310, a source follower transistor 308, and a select transistor 312. The photodiode 302 receives light and generates photocharges. The transfer transistor 304 is connected to the photodiode 302 and transfers the photocharges to the floating diffusion node 306 according to the transfer signal TG[n]. The floating diffusion node 306 receives the photocharges through the transfer transistor 304 and accumulates them. The reset transistor 310 discharges the photocharges from the floating diffusion node 306 according to the reset signal RG[n]. The source follower transistor 308 amplifies and converts the photocharges accumulated at the floating diffusion node 306 into a voltage signal. The select transistor 312 selectively outputs the voltage signal according to the selection signal SEL[n].

Figure 5:
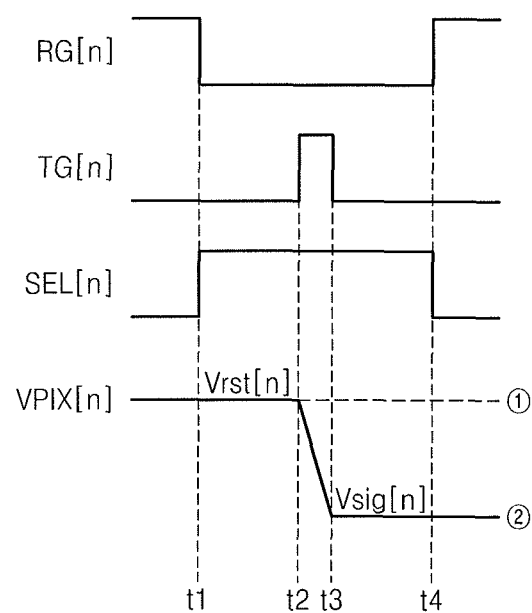
FIG. 5 illustrates operation of the pixel in FIG. 4 when the pixel outputs a pixel signal.

FIG. 5 illustrates an embodiment of a timing chart for operating pixel 300 in FIG. 4 when the pixel outputs a pixel signal VPIX[n]. Referring to FIGS. 4 and 5, the reset signal RG[n] is at a logic high until a time point t1, so that the photocharges accumulated at the floating diffusion node 306 are all discharged.

When the reset signal RG[n] transits to a logic low at time point t1, the reset transistor 310 is turned off and the selection signal SEL[n] is on. At this time, the transfer signal TG[n] is at a logic low. Therefore, photocharges generated in the photodiode 302 are not transferred to the floating diffusion node 306. The pixel signal VPIX at that time may be referred to as a reset signal Vrst[n].

During a period from time point t2 to time point t3, the transfer signal TG[n] is at a logic high and the transfer transistor 304 transfers the photocharges from the photodiode 302 to the floating diffusion node 306. During a period from time point t3 to time point t4, photocharges of the photodiode 302 are amplified and converted into a voltage signal by the source follower transistor 308 and select transistor 312. The pixel signal VPIX[n] at that time may be referred to as an image signal Vsig[n].

When the photodiode 302 does not receive light and, thus, no photocharges are generated, the voltage of reset signal Vrst may be the same as the voltage of the image signal Vsig (case ①). When the photodiode 302 receives light, photocharges are generated, amplified, and converted into a voltage signal. A voltage difference occurs between the reset signal Vrst and the image signal Vsig (case ②).

Figure 6:
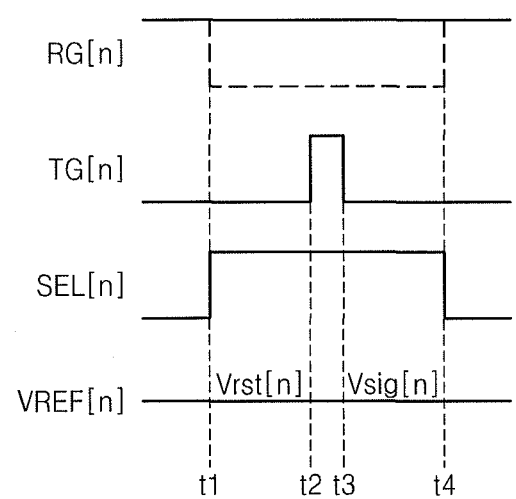
FIG. 6 illustrates operation of the pixel in FIG. 4 when the pixel outputs a reference signal.

FIG. 6 illustrates an embodiment of a timing chart for operating pixel 300 in FIG. 4 when the pixel outputs a reference signal VREF[n]. Referring to FIGS. 4 and 6, while pixel 300 outputs reference signal VREF[n] from time point t1 to time point t4, that is, while selection signal SEL[n] is at a logic high, the reset signal RG[n] may remain at logic high. In other words, the reset signal RG[n] and selection signal SEL[n] may be simultaneously activated. As a result, the voltages of the reset signal Vrst[n] and image signal Vsig[n] in the reference signal VREF[n] may be the same. The reference signal VREF[n] may correspond to pixel signal VPIX[n] generated when the photodiode 302 does not receive light. Thus, no photocharges are generated.

At this time, the transfer signal TG[n] may vary. Even though photocharges are transferred to the floating diffusion node 306 according to transfer signal TG[n], all of the photocharges are discharged through the reset transistor 310. Therefore, the reference signal VREF[n] is not influenced by transfer signal TG[n].

Figure 7:
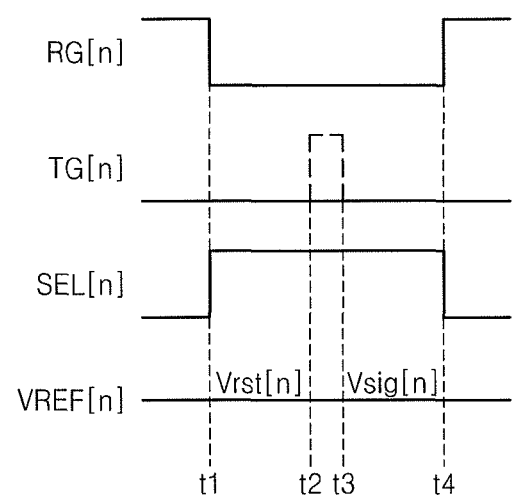
FIG. 7 illustrates another embodiment of the operation of pixel in FIG. 4 when the pixel outputs a reference signal.

FIG. 7 illustrates an embodiment of a timing chart for operating pixel 300 in FIG. 4 when the pixel outputs reference signal VREF[n]. Referring to FIGS. 4 and 7, while pixel 300 outputs reference signal VREF[n] from time point t1 to time point t4, the transfer signal TG[n] may be deactivated. Accordingly, photocharges are not transferred from the photodiode 302 to the floating diffusion node 306. As a result, the voltages of the reset signal Vrst[n] and the image signal Vsig[n] in the reference signal VREF[n] may be the same. The reference signal VREF[n] may correspond to the pixel signal VPIX[n] generated when the photodiode 302 does not receive light. Thus, no photocharges are generated.

Figure 8:
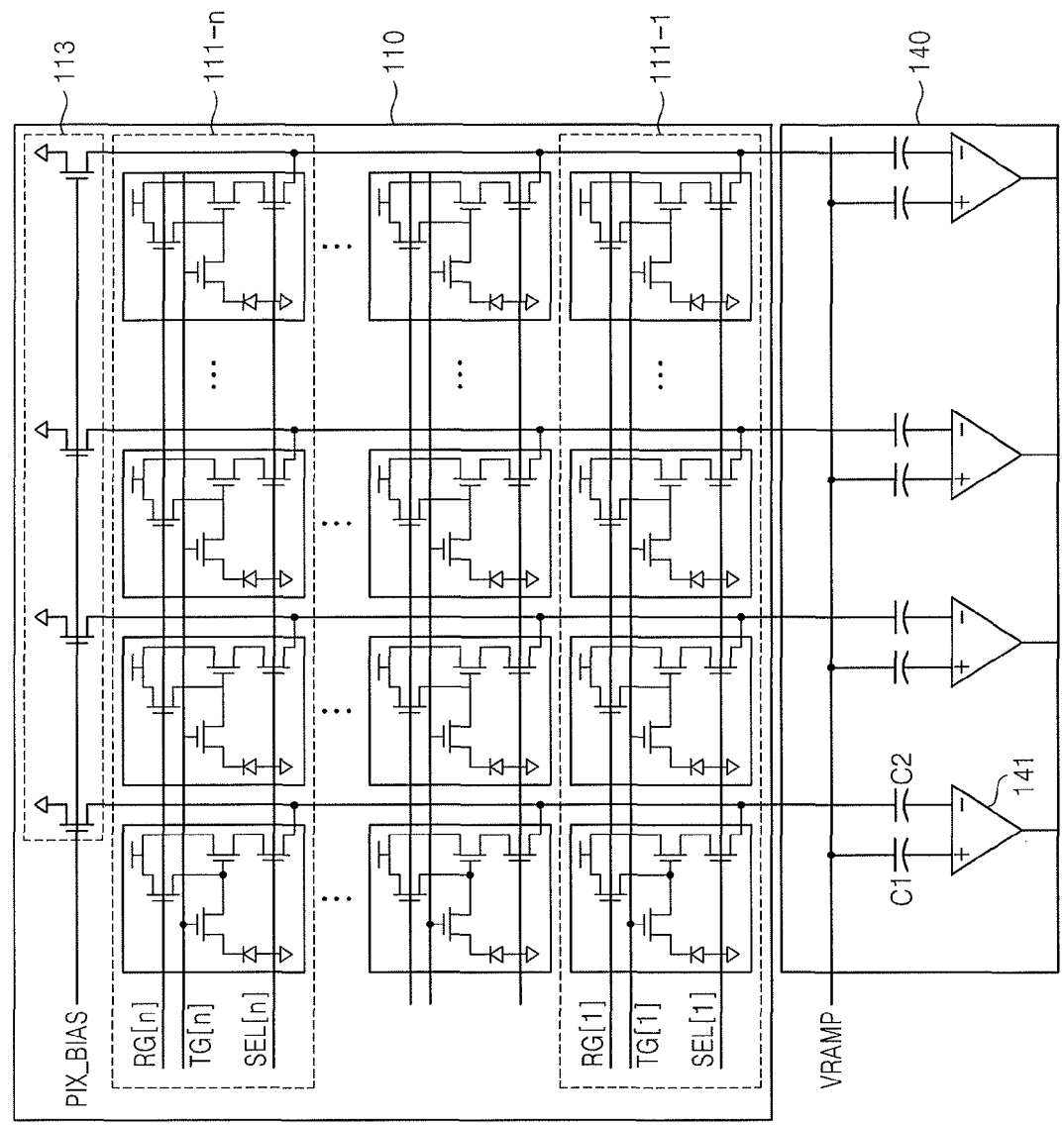
FIG. 8 illustrates an embodiment of the pixel array and correlated double sampling (CDS) block in FIG. 2.

FIG. 8 illustrates an embodiment of pixel array 110 and CDS block 140 in FIG. 2. Referring to FIGS. 2 and 8, pixel array 110 may include a plurality of pixel rows 111-1 through 111-n (where "n" is an integer of at least 2) and a current bias unit 113. The current bias unit 113 may supply a predetermined current to column lines in the pixel array 110.

The CDS block 140 may include a plurality of CDS circuits 141, a plurality of first capacitors C1, and a plurality of second capacitors C2. Each CDS circuit 141 may receive the ramp signal VRAMP from the ramp generator 190 through one of the first capacitors C1. Each CDS circuit 141 may receive pixel signal VPIX or reference signal VREF from one of the column lines in pixel array 110 through one of the second capacitors C2.

Figure 9:
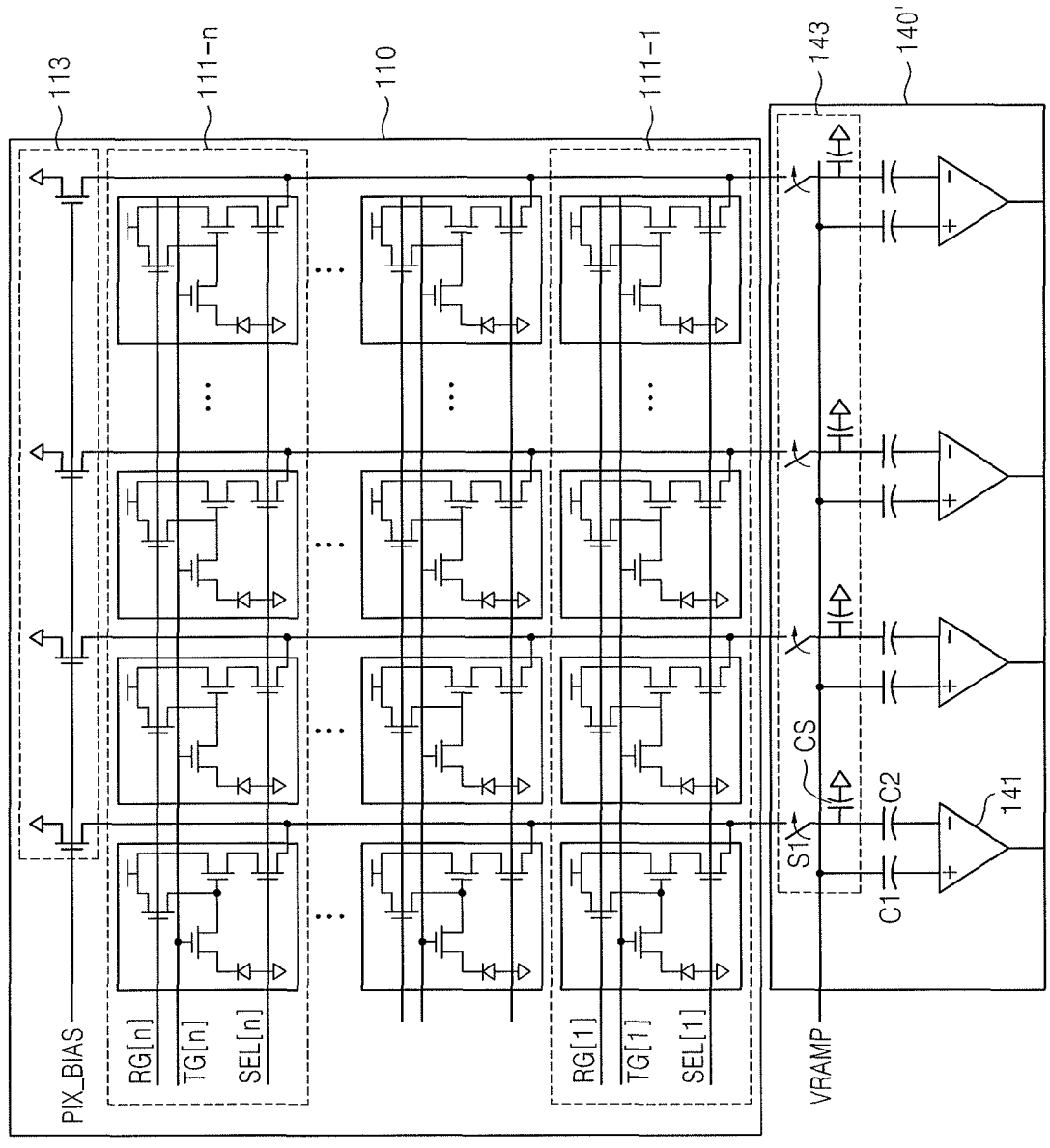
FIG. 9 illustrates another embodiment of the pixel array and CDS block in FIG. 2.

FIG. 9 illustrates another embodiment of pixel array 110 and CDS block 140 in FIG. 2. The structure in FIG. 9 is almost the same as in FIG. 8. Thus, differences from the structure in FIG. 8 will be mainly described. The CDS block 140 in FIG. 9 may include a sample-and-hold circuit 143, in addition to the structure illustrated in FIG. 8.

The sample-and-hold circuit 143 may include a plurality of switches S1 and a plurality of sampling capacitors CS, which are respectively provided for the column lines. When one of the switches S1 is turned on, pixel signal VPIX or reference signal VREF output from a corresponding column line is stored in a corresponding sampling capacitor CS. The sampling capacitor CS may store pixel signal VPIX or reference signal VREF after switch S1 is turned off. Each CDS circuit 141 may compare the pixel signal VPIX or the reference signal VREF, which is stored in the sampling capacitor CS, with the ramp signal VRAMP and output a comparison result.

Figure 10:
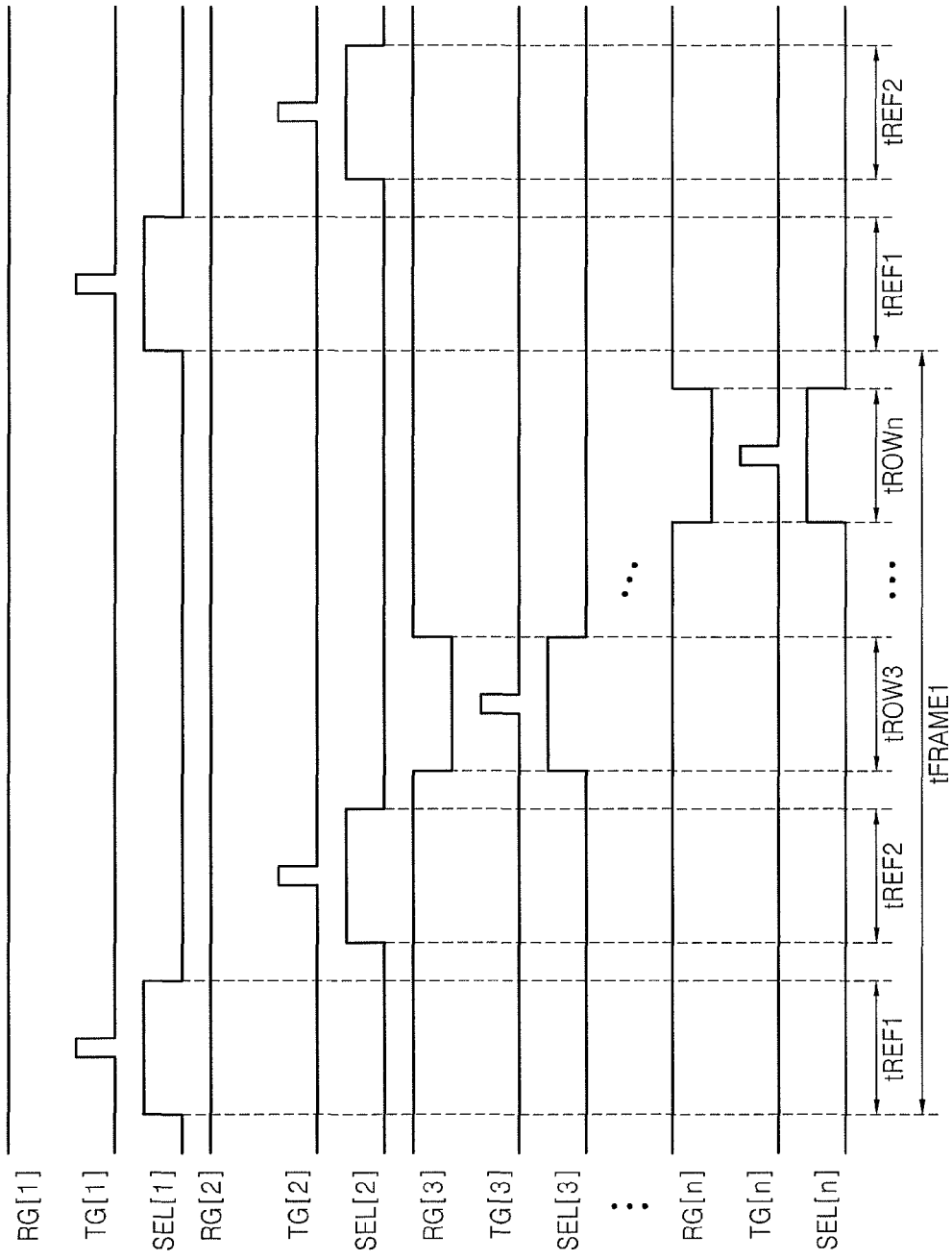
FIG. 10 illustrates an embodiment of a timing chart for a pixel array.

FIG. 10 illustrates an embodiment of a timing chart for operating pixel array 110. Referring to FIGS. 9 and 10, a case in which the first and second pixel rows 111-1 and 111-2 generate reference signal VREF and the third through n-th pixel rows 111-3 through 111-n generate pixel signal VPIX will be described. At this time, the pixel signal VPIX output from the third through n-th pixel rows 111-3 through 111-n may form a single frame. A reference signal output from the first pixel row 111-1 may be referred to as a first reference signal. A reference signal output from the second pixel row 111-2 may be referred to as a second reference signal.

The reset signal RG[1] applied to the first pixel row 111-1 is maintained at a logic high during a first reference measuring time tREF1. Accordingly, the first pixel row 111-1 outputs the first reference signal during the first reference measuring time tREF1.

The reset signal RG[2] applied to the second pixel row 111-2 is maintained at a logic high during a second reference measuring time tREF2. Accordingly, the second pixel row 111-2 outputs the second reference signal during the second reference measuring time tREF2.

The third through n-th pixel rows 111-3 through 111-n output the pixel signal VPIX during third through n-th pixel measuring times tROW3 through tROWn, respectively. A first frame time tFRAME1 includes the first reference measuring time tREF1, the second reference measuring time tREF2, and the third through n-th pixel measuring times tROW3 through tROWn. The first frame time tFRAME1 may be periodically repeated in each frame. The reference signal VREF, output for a frame during the first and second reference measuring times tREF1 and tREF2 in the first frame time tFRAME1, may be used to compensate the pixel signal VPIX output for the frame during the third through n-th pixel measuring times tROW3 through tROWn.

In the embodiment in FIG. 10, pixel array 110 generates the reference signal VREF first and then generates the pixel signal VPIX for each frame. However, the signals may be generated in a different order or manner in other embodiments. The pixel array 110 may generate pixel signal VPIX first and then generate the reference signal VREF for each frame in other embodiments. Also, pixel array 110 may generate reference signal VREF not for each frame, but for a plurality or predetermined of frames. The pixel array may generate reference signal VREF whenever generating the pixel signal VPIX for a predetermined number of pixel rows, in other embodiments.

The number of pixel rows generating the reference signal VREF may be 1 or an integer greater than 1. When the number of pixel rows generating the reference signal VREF increases, the accuracy of reference column fixed pattern noise (CFPN) data also increases. In one embodiment, a pixel row generating the reference signal VREF may be selected randomly.

Figure 11:
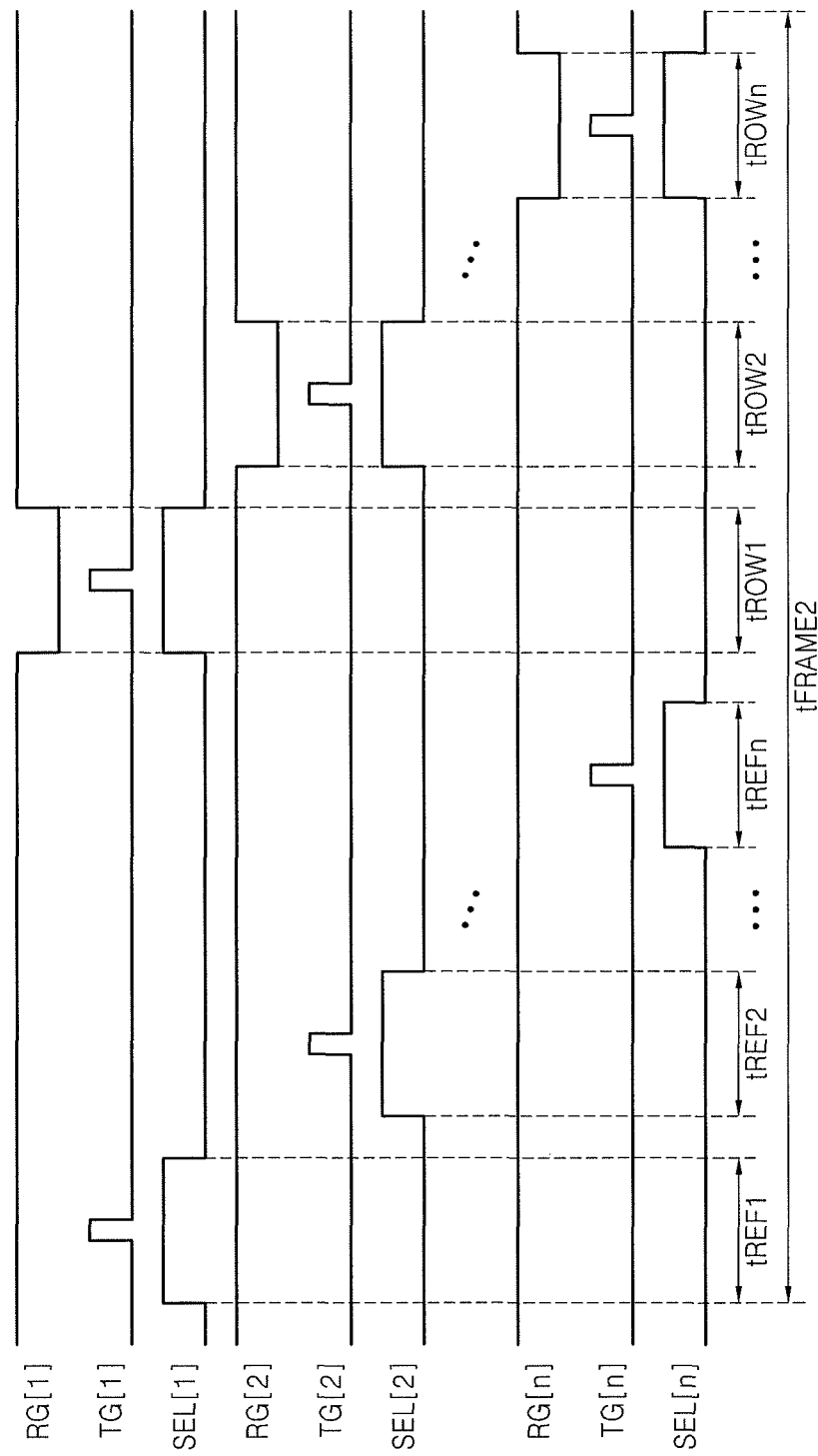
FIG. 11 illustrates another embodiment of a timing chart for a pixel array.

FIG. 11 illustrates another embodiment of a timing chart for operating pixel array 110. Referring to FIGS. 9 and 11, a case in which the first through n-th pixel rows 111-1 through 111-n generate reference signal VREF and pixel signal VPIX will be described. At this time, pixel signal VPIX output from the first through n-th pixel rows 111-1 through 111-n may form a single frame. A reference signal output from a k-th pixel row 111-k (where "k" is an integer of at least 1 and at most "n") may be referred to as a k-th reference signal.

The reset signal RG[1] applied to the first pixel row 111-1 is maintained at a logic high during a first reference measuring time tREF1. Accordingly, the first pixel row 111-1 output the first reference signal during the first reference measuring time tREF1.

The reset signal RG[2] applied to the second pixel row 111-2 is maintained at a logic high during a second reference measuring time tREF2. Accordingly, the second pixel row 111-2 output the second reference signal during the second reference measuring time tREF2. In the same manner, the third through n-th pixel rows 111-3 through 111-n output third through n-th reference signals, respectively.

The first through n-th pixel rows 111-1 through 111-n output the pixel signal VPIX during first through n-th pixel measuring times tROW1 through tROWn, respectively. A second frame time tFRAME2 includes first through n-th reference measuring times tREF1 through tREFn and the first through n-th pixel measuring times tROW1 through tROWn. The second frame time tFRAME2 may be periodically repeated in each frame. The reference signal VREF output for a frame during the first through n-th reference measuring times tREF1 through tREFn in the second frame time tFRAME2 may be used to compensate the pixel signal VPIX output for the frame during the first through n-th pixel measuring times tROW1 through tROWn.

In the embodiments illustrated in FIG. 11, the pixel array 110 generates the reference signal VREF first and then generates the pixel signal VPIX for each frame. However, in other embodiments, these signals may be generated in a different order or manner. For example, the pixel array 110 may generate pixel signal VPIX first and then generate the reference signal VREF for each frame in other embodiments. The pixel array 110 may generate the reference signal VREF not for each frame, but for a plurality or predetermined number of frames in further embodiments.

Figure 12:
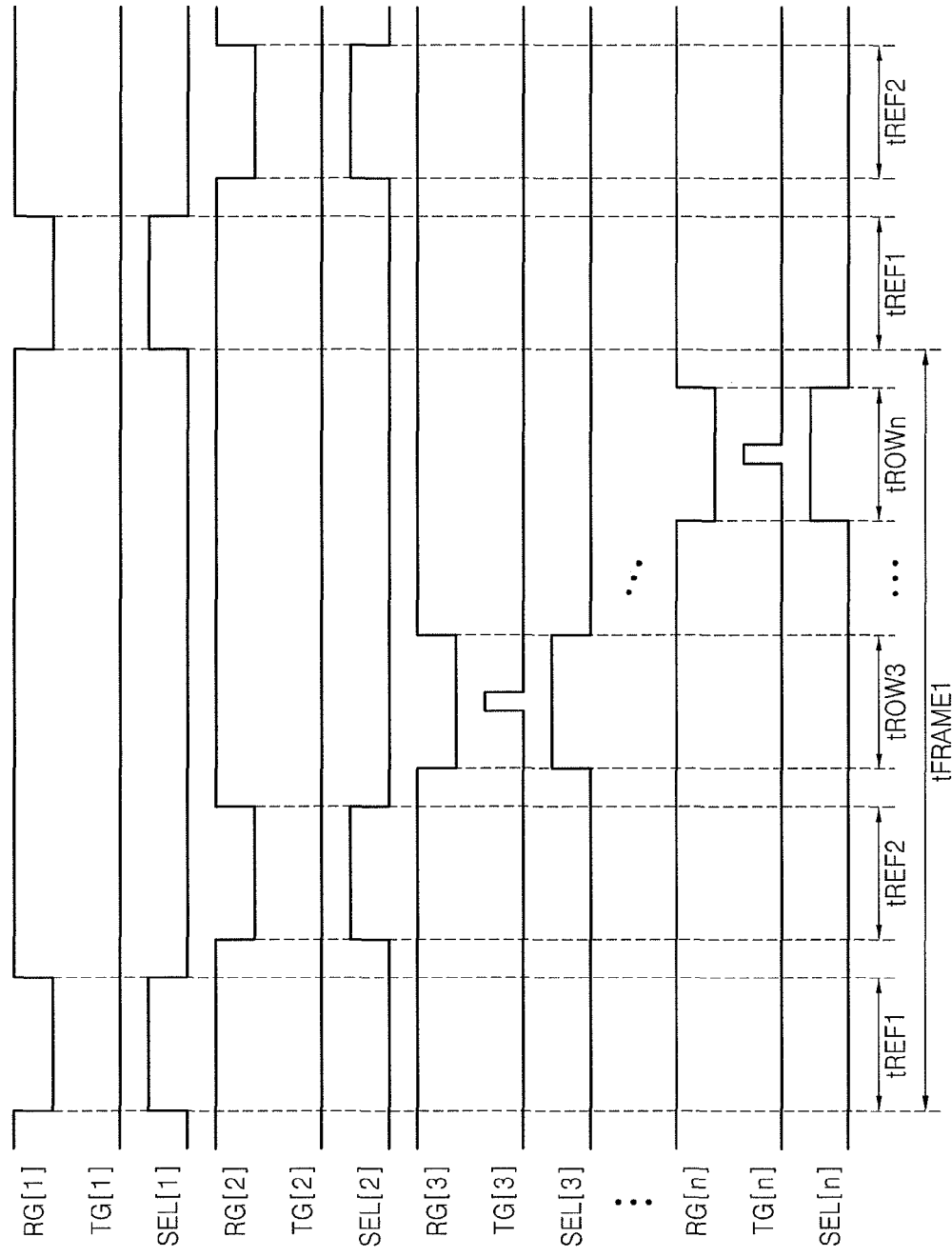
FIG. 12 illustrates another embodiment of a timing chart for a pixel array.

FIG. 12 illustrates another embodiment of a timing chart for operating pixel array 110. Referring to FIGS. 9 and 12, a case in which the first and second pixel rows 111-1 and 111-2 generate the reference signal VREF and the third through n-th pixel rows 111-3 through 111-n generate the pixel signal VPIX will be described. At this time, the pixel signal VPIX output from the third through n-th pixel rows 111-3 through 111-n may form a single frame.

The transfer signal TG[1] applied to the first pixel row 111-1 is maintained at a logic low during a first reference measuring time tREF1. Accordingly, the first pixel row 111-1 may output the first reference signal during the first reference measuring time tREF1.

The transfer signal TG[2] applied to the second pixel row 111-2 is maintained at a logic low during a second reference measuring time tREF2. Accordingly, the second pixel row 111-2 may output the second reference signal during the second reference measuring time tREF2.

The third through n-th pixel rows 111-3 through 111-n may output the pixel signal VPIX during third through n-th pixel measuring times tROW3 through tROWn, respectively. A first frame time tFRAME1 includes the first reference measuring time tREF1, the second reference measuring time tREF2, and the third through n-th pixel measuring times tROW3 through tROWn. The first frame time tFRAME1 may be periodically repeated in each frame. The reference signal VREF output for a frame during the first and second reference measuring times tREF1 and tREF2 in the first frame time tFRAME1 may be used to compensate the pixel signal VPIX output for the frame during the third through n-th pixel measuring times tROW3 through tROWn.

In the embodiments illustrated in FIG. 12, pixel array 110 generates the reference signal VREF first and then generates the pixel signal VPIX for each frame. The manner and/or order of generation of these signals may be different in other embodiments. For example, pixel array 110 may generate pixel signal VPIX first and then generate the reference signal VREF for each frame. Additionally, or alternatively, the pixel array 110 may generate the reference signal VREF not for each frame, but for a plurality or predetermined number of frames. Also, the pixel array may generate the reference signal VREF whenever pixel signal VPIX is generated for a predetermined number of pixel rows.

The number of pixel rows generating reference signal VREF may be 1 or an integer greater than 1. When the number of pixel rows generating reference signal VREF increases, the accuracy of reference column fixed pattern noise (CFPN) data may also increase. In one embodiment, a pixel row generating the reference signal VREF may be selected randomly.

Figure 13:
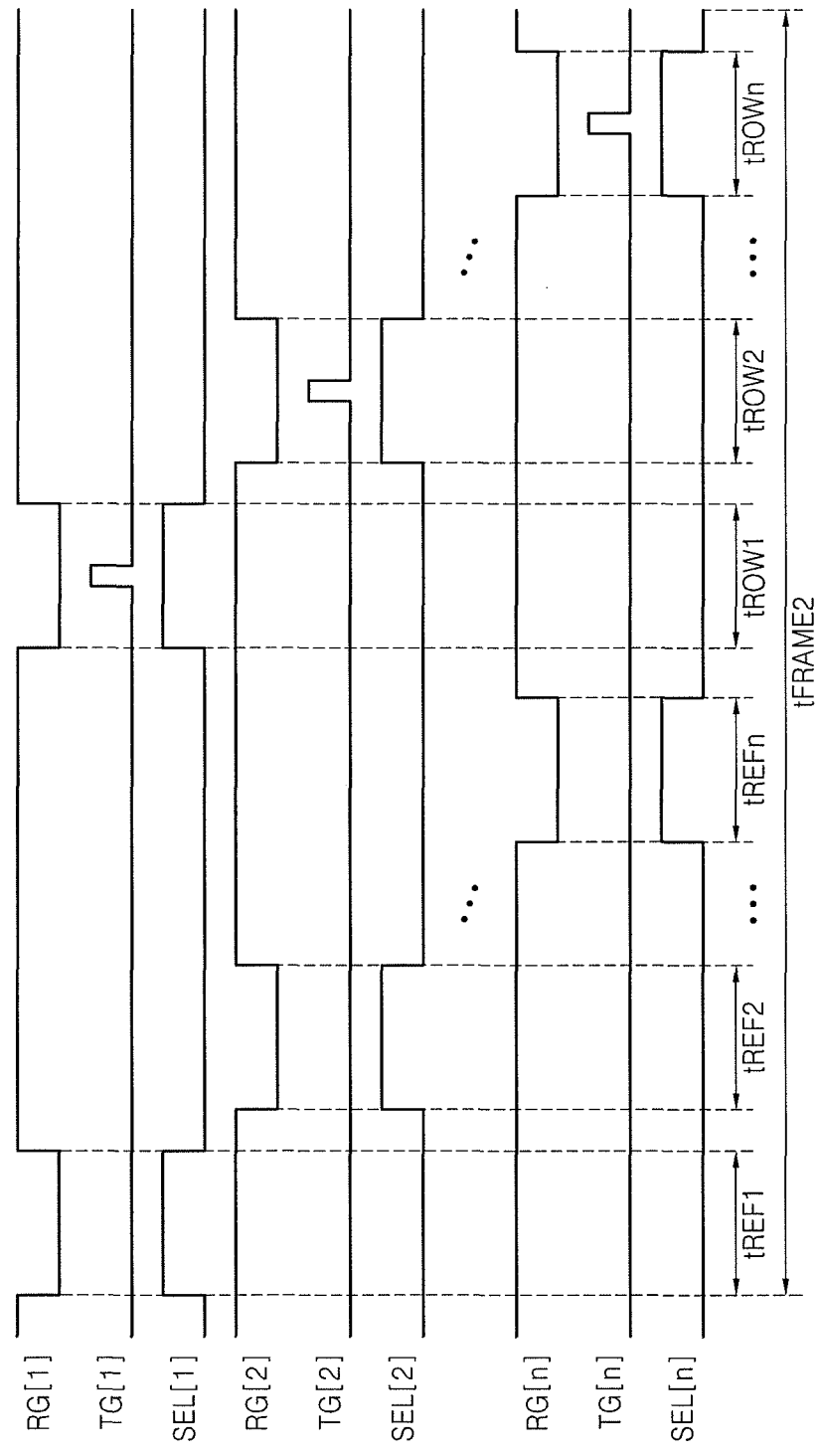
FIG. 13 illustrates another embodiment of a timing chart for a pixel array.

FIG. 13 illustrates another embodiment of a timing chart for operating pixel array 110. Referring to FIGS. 9 and 13, a case in which the first through n-th pixel rows 111-1 through 111-n generate the reference signal VREF and the pixel signal VPIX will be described. At this time, the pixel signal VPIX output from the first through n-th pixel rows 111-1 through 111-n may form a single frame. A reference signal output from a k-th pixel row 111-k (where "k" is an integer of at least 1 and at most "n") may be referred to as a k-th reference signal.

The transfer signal TG[1] applied to the first pixel row 111-1 is maintained at a logic low during a first reference measuring time tREF1. Accordingly, the first pixel row 111-1 may output the first reference signal during the first reference measuring time tREF1.

The transfer signal TG[2] applied to the second pixel row 111-2 is maintained at a logic low during a second reference measuring time tREF2. Accordingly, the second pixel row 111-2 may output the second reference signal during the second reference measuring time tREF2. In the same manner, the third through n-th pixel rows 111-3 through 111-n may output third through n-th reference signals, respectively.

The first through n-th pixel rows 111-1 through 111-n output pixel signal VPIX during first through n-th pixel measuring times tROW1 through tROWn, respectively. A second frame time tFRAME2 includes first through n-th reference measuring times tREF1 through tREFn and first through n-th pixel measuring times tROW1 through tROWn. The second frame time tFRAME2 may be periodically repeated in each frame. The reference signal VREF output for a frame during the first through n-th reference measuring times tREF1 through tREFn in the second frame time tFRAME2 may be used to compensate pixel signal VPIX output for the frame during the first through n-th pixel measuring times tROW1 through tROWn.

In the aforementioned embodiments, pixel array 110 generates reference signal VREF first and then generates the pixel signal VPIX for each frame. However, these signals may be generated in a different manner or order in other embodiments. For example, pixel array 110 may generate pixel signal VPIX first and then generate the reference signal VREF for each frame. Also, pixel array 110 may generate the reference signal VREF not for each frame, but for a plurality or predetermined number of frames.

Figure 14:
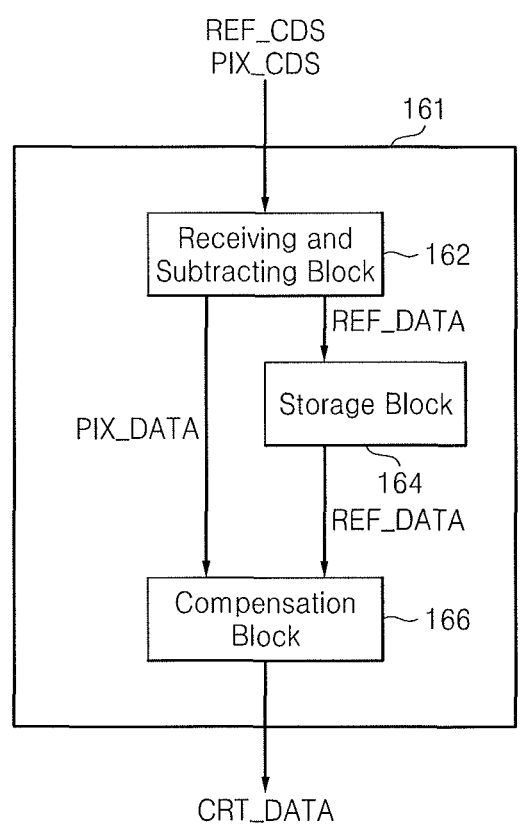
FIG. 14 illustrates an embodiment of the column mismatch compensator (CMC) in FIG. 2.

FIG. 14 illustrates an embodiment of CMC 161 in FIG. 2. Referring to FIGS. 2 and 14, CMC 161 may include a receiving and subtracting block 162, a storage block 164, and a compensation block 166. The receiving and subtracting block 162 receives a digital signal from the counter 150. The digital signal output from the counter 150 may include reference CDS signal REF_CDS and pixel CDS signal PIX_CDS. The reference CDS signal REF_CDS may include a signal corresponding to reset signal Vrst and a signal corresponding to image signal Vsig. The pixel CDS signal PIX_CDS may also include a signal corresponding to reset signal Vrst and a signal corresponding to image signal Vsig.

The receiving and subtracting block 162 generates reference CFPN data REF_DATA based on reference CDS signal REF_CDS and pixel data PIX_DATA based on pixel CDS signal PIX_CDS. For instance, the receiving and subtracting block 162 may generate the reference CFPN data REF_DATA and the pixel data PIX_DATA, first, by subtracting the signal corresponding to the image signal Vsig from the signal corresponding to the reset signal Vrst in the reference CDS signal REF_CDS. Then, the signal corresponding to the image signal Vsig may be subtracted from the signal corresponding to the reset signal Vrst in the pixel CDS signal PIX_CDS.

The storage block 164 receives and stores the reference CFPN data REF_DATA. In other embodiments, the storage block 164 may also receive and store the pixel data PIX_DATA.

The compensation block 166 may receive the pixel data PIX_DATA from the receiving and subtracting block 162 or the storage block 164, and may receive the reference CFPN data REF_DATA from the storage block 164. When the reference signal VREF is generated from a plurality of pixel rows of the pixel array 110, the reference CFPN data REF_DATA may include data corresponding to each of the pixel rows of the pixel array 110. The compensation block 166 may take an average of the data in the reference CFPN data REF_DATA. The compensation block 166 may compensate the pixel data PIX_DATA based on the average of the reference CFPN data REF_DATA and output the compensated data CRT_DATA.

Figure 15:
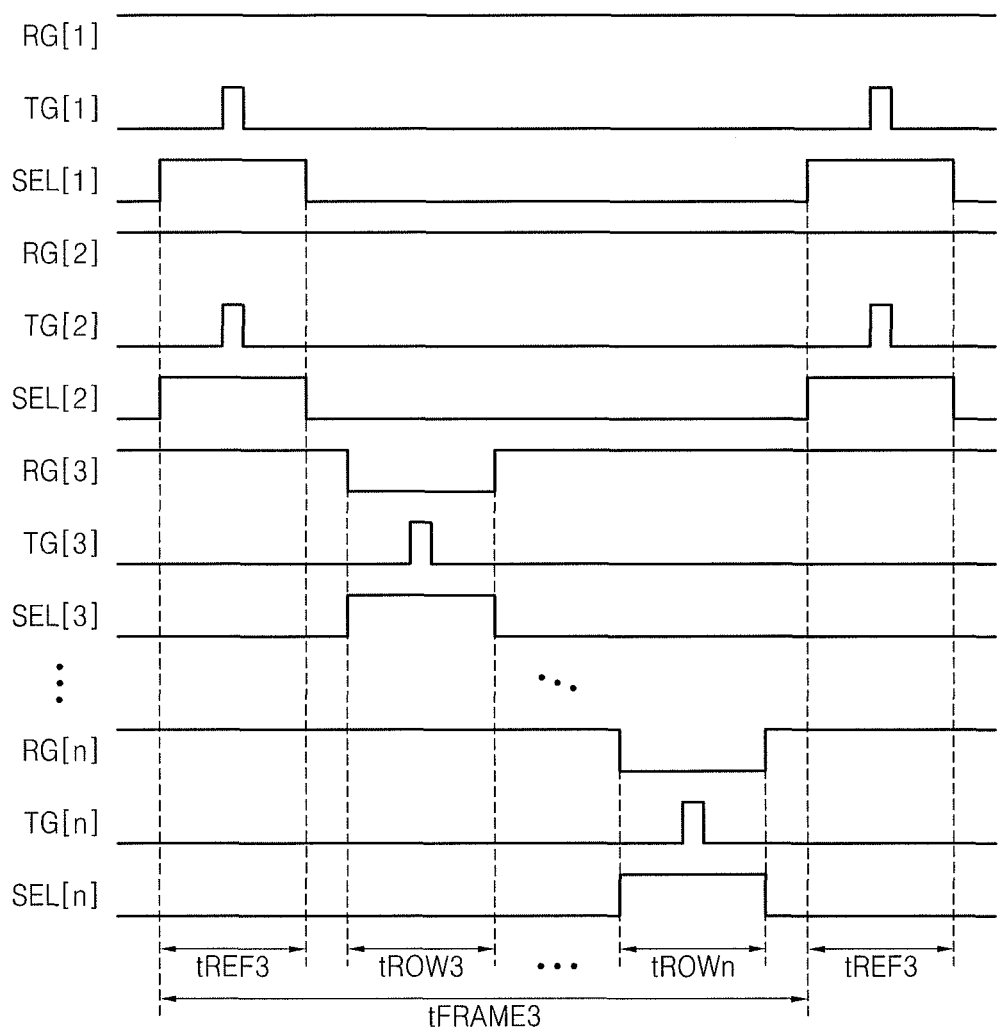
FIG. 15 illustrates another embodiment of a timing chart for a pixel array.

FIG. 15 illustrates another embodiment of a timing chart for operating pixel array 110. Referring to FIGS. 9 and 15, a case in which the first and second pixel rows 111-1 and 111-2 generate reference signal VREF and the third through n-th pixel rows 111-3 through 111-$n$ generate pixel signal VPIX will be described. At this time, pixel signal VPIX output from the third through n-th pixel rows 111-3 through 111-$n$ may form a single frame. A reference signal output from the first pixel row 111-1 may be referred to as a first reference signal and a reference signal output from the second pixel row 111-2 is referred to as a second reference signal.

The reset signal RG[1] applied to the first pixel row 111-1 may be maintained at a logic high during a third reference measuring time tREF3. Accordingly, the first pixel row 111-1 may output the first reference signal during the third reference measuring time tREF3.

The reset signal RG[2] applied to the second pixel row 111-2 may be maintained at a logic high during the third reference measuring time tREF3. Accordingly, the second pixel row 111-2 may output the second reference signal during the third reference measuring time tREF3.

The first and second pixel rows 111-1 and 111-2 simultaneously output the first and second reference signals, respectively, during the third reference measuring time tREF3. Accordingly, an average of the first and second reference signals may be obtained in each column line and output as the reference signal VREF.

The third through n-th pixel rows 111-3 through 111-$n$ output pixel signal VPIX during third through n-th pixel measuring times tROW3 through tROWn, respectively. A frame time tFRAME includes the third reference measuring time tREF3 and the third through n-th pixel measuring times tROW3 through tROWn. The frame time tFRAME3 may be periodically repeated in each frame. The reference signal VREF output for a frame during the third reference measuring time tREF3 may be used to compensate pixel signal VPIX output for the frame during the third through n-th pixel measuring times tROW3 through tROWn.

In the embodiments illustrated in FIG. 15, pixel array 110 generates reference signal VREF first and then generates pixel signal VPIX for each frame. These signals may be generated in a different manner or order in other embodiments. For example, pixel array 110 may generate pixel signal VPIX first and then generate reference signal VREF for each frame. Additionally, or alternatively, pixel array 110 may generate reference signal VREF not for each frame, but for a plurality or predetermined number of frames.

The number of pixel rows generating reference signal VREF may be 1 or an integer greater than 1. When the number of pixel rows generating reference signal VREF increases, the accuracy of reference CFPN data may also increase. A pixel row generating reference signal VREF may be selected randomly.

Figure 16:
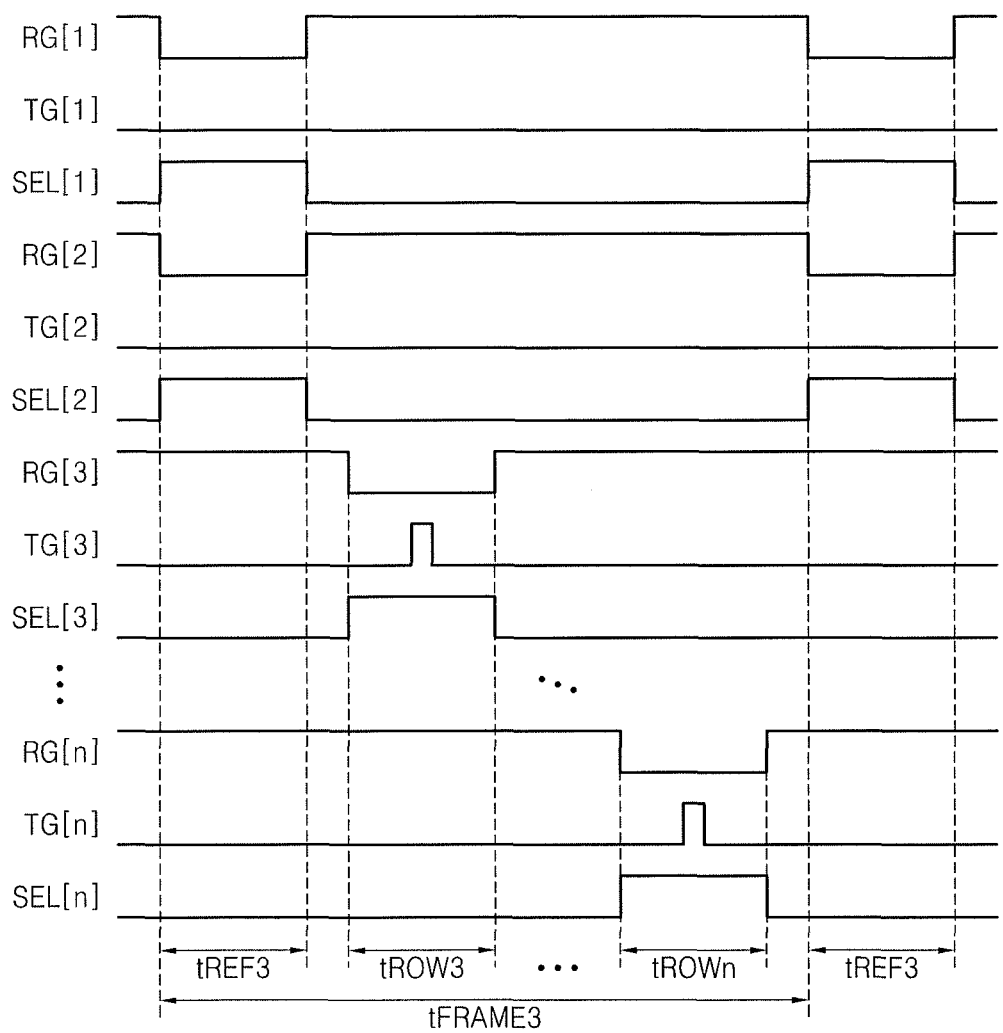
FIG. 16 illustrates another embodiment of a timing chart for a pixel array.

FIG. 16 illustrates another embodiment of a timing chart for operating pixel array 110. The timing chart in FIG. 16 is almost the same as that illustrated in FIG. 15. Therefore differences between the two will be mainly described.

Referring to FIG. 16, reset signals RG[1] and RG[2] and transfer signals TG[1] and TG[2] are deactivated during a third reference measuring time tREF3. Accordingly, the first and second pixel rows 111-1 and 111-2 simultaneously output the first and second reference signals, respectively, during the third reference measuring time tREF3. An average of the first and second reference signals may be obtained in each column line and output as the reference signal VREF.

Figure 17:
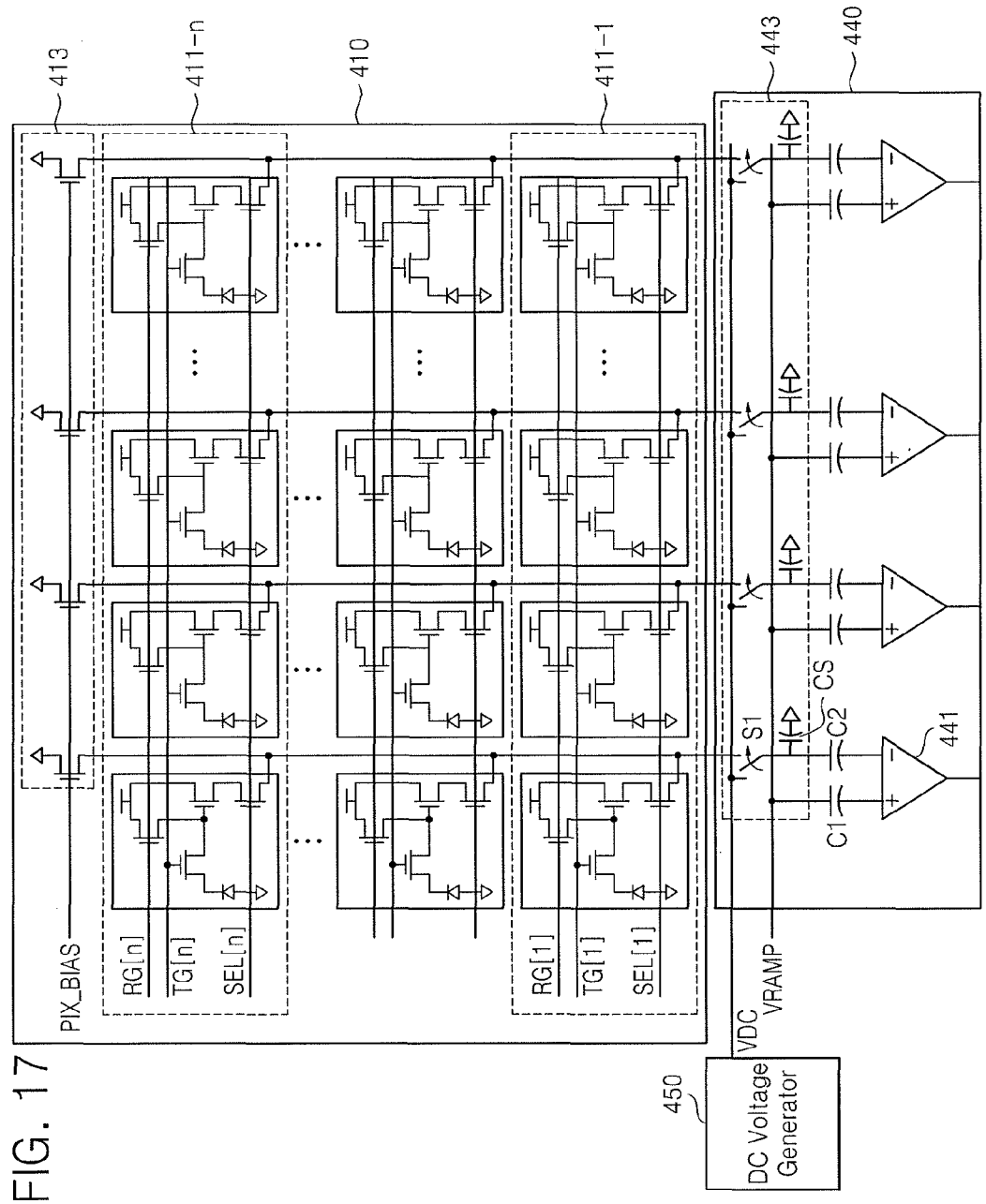
FIG. 17 illustrates a comparison example in which a reference signal is generated using a separate DC voltage generator instead of a pixel array.

FIG. 17 illustrates a comparison example in which a reference signal is generated using a separate DC voltage generator 450, instead of the pixel array 410. In FIG. 17, the image sensor includes the separate DC voltage generator 450. The separate DC voltage generator 450 may output a predetermined DC voltage VDC.

A switch S1 of a sample-and-hold circuit 443 may selectively apply the DC voltage VDC or the pixel signal VPIX to a CDS circuit 441. A CDS block 440 may generate a reference CDS signal in response to the DC voltage VDC, and may generate a pixel CDS signal in response to the pixel signal VPIX. The reference CDS signal may include a column offset when a pixel is dark. The reference CDS signal may be used to compensate the pixel CDS signal.

The comparison example in FIG. 17 requires additional hardware to generate the DC voltage VDC as a reference voltage. However, according to one or more embodiments described herein, the reference voltage is generated using the pixel array 410 by controlling the timing of control signals (e.g., a reset signal and a transfer signal) for the pixel array 410. As a result, no additional hardware is required, and the size and manufacturing cost of an image sensor are reduced.

Also, the reference CDS signal generated in the comparison example includes a column offset occurring in the sample-and-hold circuit 443 and the CDS circuit 441, but does not include a column offset occurring in the current bias circuit 413. In contrast, according to one or more of the aforementioned embodiments, the reference CDS signal includes the column offset occurring in the current bias circuit 413 as well as the column offset occurring in the sample- and hold circuit 443 and the CDS circuit 441. Therefore, the column offset may be more precisely compensated for. As a result, the picture quality of images is improved.

Also, the separate DC voltage generator 450 in the comparison example needs to drive capacitors for all columns in the CDS block 440. When the number of columns in the pixel array 410 increases with the increase of the number of pixels, the number of capacitors that need to be driven by the separate DC voltage generator 450 also increases. For this reason, the comparison example is suitable to only low-pixel design. In contrast, according to one or more embodiments, a pixel output from each column drives capacitors for the column. Therefore, the embodiments described herein may be used regardless the number of pixels in the pixel array 410.

Figure 18:
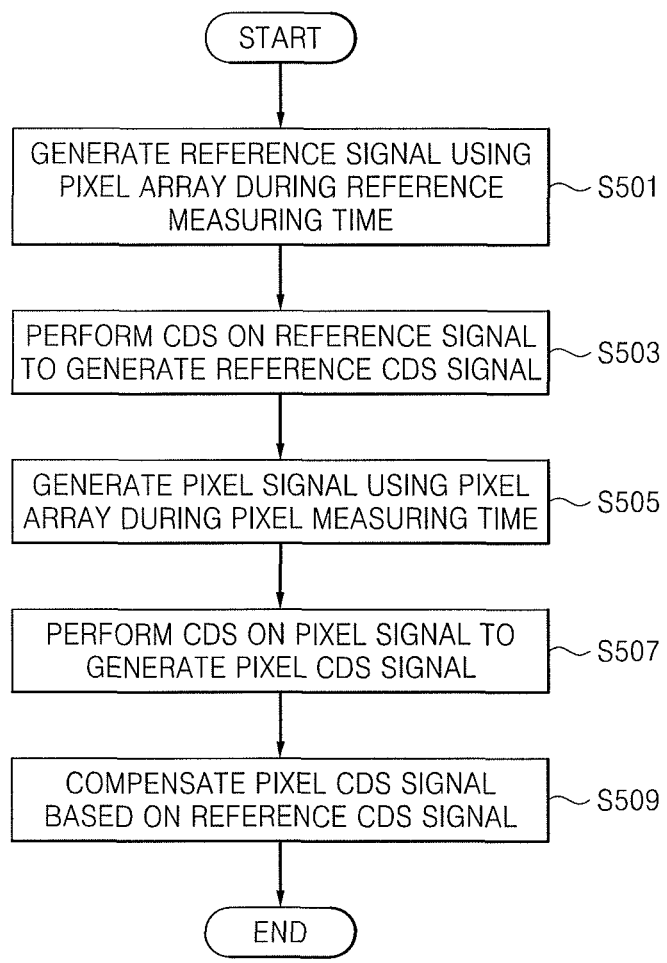
FIG. 18 illustrates an embodiment of a method for processing an image.

FIG. 18 illustrates an embodiment of a method of processing an image. Referring to FIGS. 2 and 18, pixel array 110 generates reference signal VREF during a reference measuring time in operation S501. The CDS block 140 and the counter 150 perform CDS on the reference signal VREF and generate the reference CDS signal REF_CDS in operation S503. The pixel array 110 generates the pixel signal VPIX during a pixel measuring time in operation S505. The CDS block 140 and the counter 150 perform CDS on the pixel signal VPIX and generate the pixel CDS signal PIX_CDS in operation S507. The CMC 161 compensates the pixel CDS signal PIX_CDS based on the reference CDS signal REF_CDS in operation S509.

Figure 19:
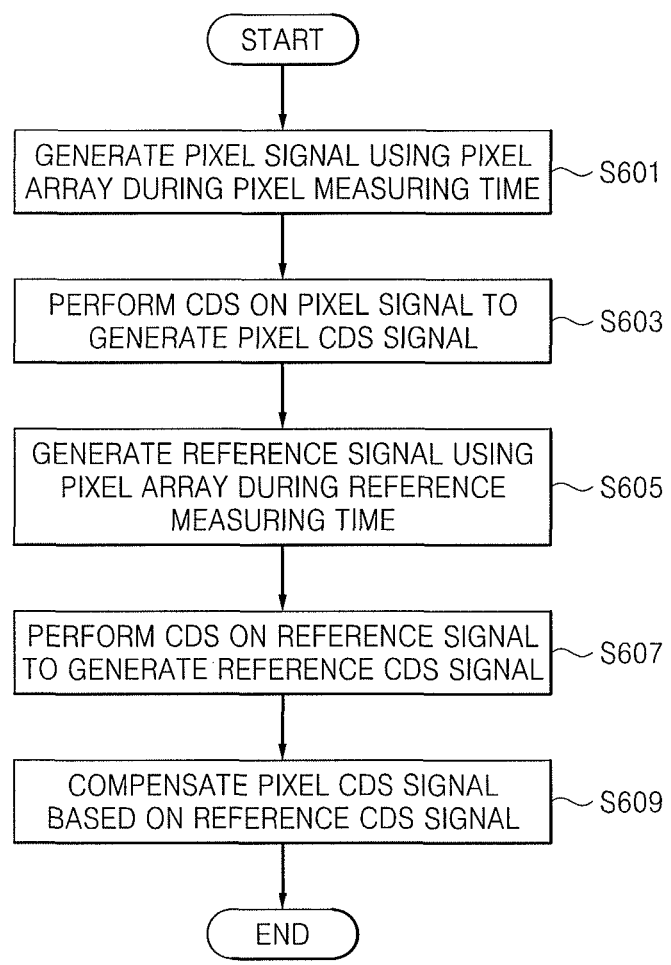
FIG. 19 illustrates another embodiment of a method for processing an image.

FIG. 19 illustrates another embodiment of a method of processing an image. Referring to FIGS. 2 and 19, pixel array 110 generates the pixel signal VPIX during a pixel measuring time in operation S601. The CDS block 140 and the counter 150 perform CDS on the pixel signal VPIX and generate the pixel CDS signal PIX_CDS in operation S603. The pixel array 110 generates the reference signal VREF during a reference measuring time in operation S605. The CDS block 140 and the counter 150 perform CDS on the reference signal VREF and generate the reference CDS signal REF_CDS in operation S607. The CMC 161 compensates the pixel CDS signal PIX_CDS based on the reference CDS signal REF_CDS in operation S609.

Figure 20:
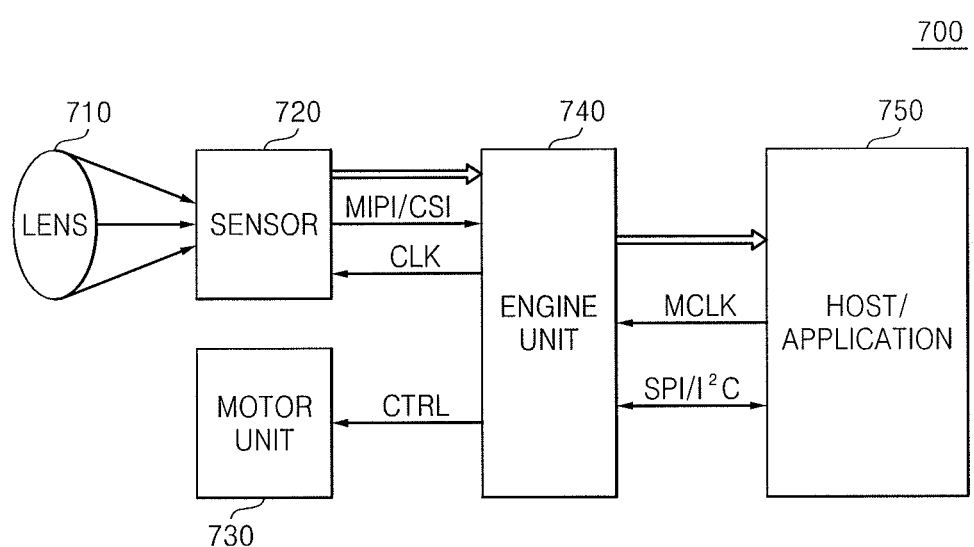
FIG. 20 illustrates an embodiment of a camera system.

FIG. 20 illustrates an embodiment of a camera system 700 which may include a digital camera. Referring to FIG. 20, the camera system 700 may include a lens 710, an image sensor 720, a motor unit 730, and an engine unit 740. The image sensor 720 may be the image sensor 100 described with reference to FIGS. 1 through 16.

The lens 710 focuses incident light onto a light receiving area (e.g., a photodiode) in image sensor 720. The image sensor 720 generates image data based on the incident light received through lens 710. The image sensor 720 may provide the image data based on a clock signal CLK. Image sensor 720 may interface with engine unit 740 using a suitable interface, e.g., mobile industry processor interface (MIPI) and/or a camera serial interface (CSI). Motor unit 730 may adjust the focus of lens 710 in response to a control signal CTRL received from engine unit 740 and/or may perform shuttering.

Engine unit 740 controls image sensor 720 and motor unit 730. The engine unit 740 may generate YUV data, which includes information corresponding to a distance to an object, a luminance component, a difference between the luminance component and a blue component, a difference between the luminance component and a red component, and/or compressed data (e.g., Joint Photography Experts Group (JPEG) data) based on distance and/or image data received from image sensor 720.

Engine unit 740 may be connected to a host/application 750 and may provide the YUV data or JPEG data to host/application 750 based on a master clock signal MCLK. In addition, engine unit 740 may interface with host/application 750 using a serial peripheral interface (SPI) and/or an inter integrated circuit (I2C).

Figure 21:
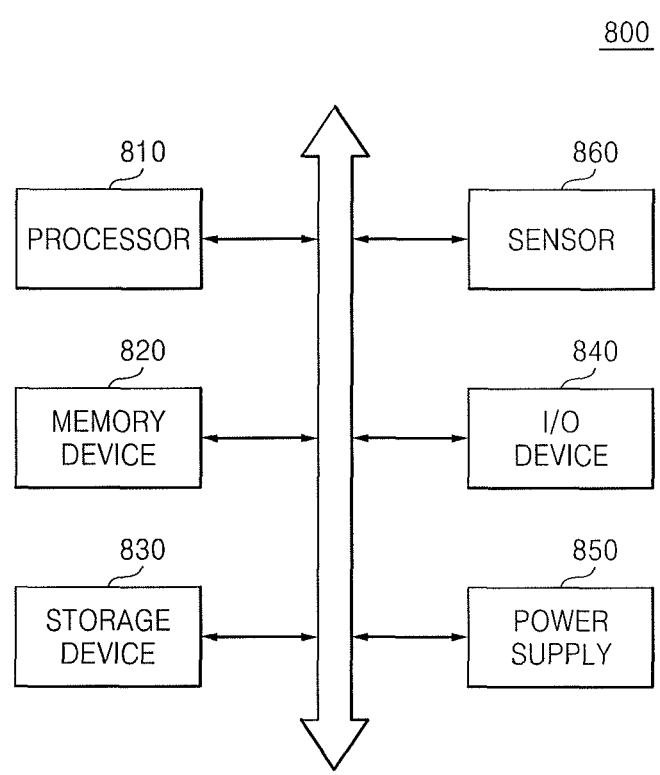
FIG. 21 illustrates an embodiment of a computing system.

FIG. 21 illustrates an embodiment of a computing system 800 which includes a processor 810, a memory device 820, a storage device 830, an input/output (I/O) device 840, a power supply 850, and an image sensor 860. Image sensor 860 may be image sensor 100 described with reference to FIGS. 1 through 16. Although not shown in FIG. 21, the computing system 800 may also include ports that can communicate with video cards, sound cards, memory cards, universal serial bus (USB) devices, and/or other electronic devices.

Processor 810 may perform particular calculations or tasks. For example, processor 810 may include a microprocessor or a central processing unit (CPU). Processor 810 may communicate with memory device 820, storage device 830, and I/O device 840 through an address bus, a control bus, and a data bus. Processor 810 may also be connected to an extended bus such as a peripheral component interconnect (PCI) bus.

Memory device 820 may store data for operations of computing system 800. Memory device 820 may be or include, for example, a DRAM, mobile DRAM, SRAM, phase-change RAM (PRAM), ferroelectric RAM (FRAM), resistive RAM (RRAM or ReRAM), and/or magnetic RAM (MRAM). Storage device 830 may include a solid state drive (SSD), a hard disk drive (HDD), and a compact disk-read only memory (CD-ROM).

I/O device 840 may include an input device such as a keyboard, a keypad, or a mouse, and an output device such as a printer or a display. Power supply 850 may provide an operating voltage for operation of computing system 800.

Image sensor 860 may communicate with processor 810 through buses or other communication links. Image sensor 860 and processor 810 may be integrated together into a single chip or may be separately integrated into different chips, respectively. Moreover, computing system 800 may be any type of computing system using image sensor 860. For instance, computing system 800 may include a digital camera, a cellular phone, a personal digital assistant (PDA), a portable multimedia player (PMP), or a smart phone.

Figure 22:
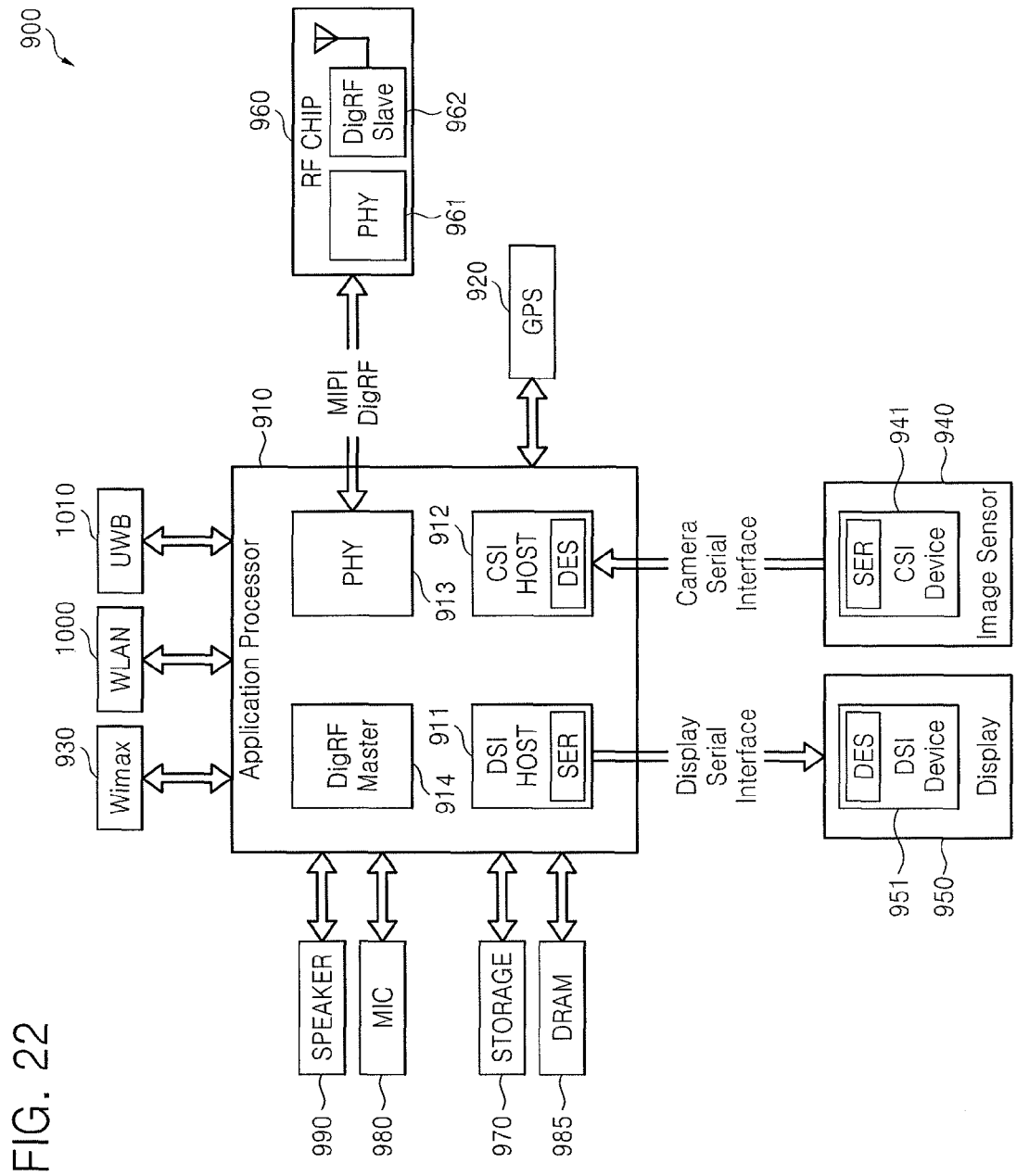
FIG. 22 illustrates another embodiment of a computing system.

FIG. 22 illustrates another embodiment of a computing system 900 which may be implemented by a data processing apparatus that can use or support the MIPI interface. The computing system 900 includes an application processor 910, an image sensor 940, and a display 950.

A camera serial interface (CSI) host 912 included in application processor 910 performs serial communication with a CSI device 941 included in image sensor 940 through CSI. For example, an optical de-serializer (DES) may be implemented in CSI host 912. An optical serializer (SER) may be implemented in the CSI device 941. Image sensor 940 may be image sensor 100 described with reference to FIGS. 1 through 16.

A display serial interface (DSI) host 911 included in application processor 910 performs serial communication with a DSI device 951 included in display 950 through DSI. For example, an optical serializer may be implemented in DSI host 911, and an optical de-serializer may be implemented in DSI device 951.

The computing system 900 may also include a radio frequency (RF) chip 960 which communicates with application processor 910. A physical layer (PHY) 913 of computing system 900 and a PHY of RF chip 960 communicate data with each other according to a predetermined standard, e.g., MIPI DigRF standard. The computing system 900 may further include at least one among a GPS 920, a storage device 970, a microphone 980, a DRAM 985, or a speaker 990. Computing system 900 may communicate using UWB (Ultra WideBand 1010), WLAN (Wireless Local Area Network 1000) or WIMAX (Worldwide Interoperability for Microwave Access 930), etc. But, structure and interface of the computing system 900 are not restricted to these embodiments.

As described above, according to one or more embodiments, an image sensor reduces CFPN using a reference signal, e.g., a dark signal generated by a pixel array without requiring additional hardware. As a result, the size and manufacturing cost of the image sensor may be reduced and picture quality may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
a pixel array to output a pixel signal from each column line during a pixel measuring time, and to output a reference signal during a reference measuring time different from the pixel measuring time, the reference signal to be output from at least one pixel during the reference measuring time and the at least one pixel to receive light during the pixel measuring time;
a column signal processor to perform correlated double sampling (CDS) on the reference signal to generate a reference CDS signal, and to perform CDS on the pixel signal to generate a pixel CDS signal; and
a column mismatch compensator to compensate the pixel CDS signal based on the reference CDS signal, wherein each of at least one pixel row in the pixel array includes a plurality of pixels controlled by a transfer signal, a reset signal, and a selection signal, and
wherein each of the pixels including the at least one pixel includes:
a photodiode to receive light and generate photocharges;
a transfer transistor to transfer the photocharges based on the transfer signal;
a floating diffusion node to accumulate the photocharges transferred through the transfer transistor;
wherein a reset transistor to discharge the photocharges from the floating diffusion node based on the reset signal;
a source follower transistor to amplify and convert the photocharges in the floating diffusion node into a voltage signal; and
a selection transistor to selectively output the voltage signal based on the selection signal, and wherein the transfer signal is deactivated while the selection signal is activated during the reference measuring time, wherein the reset signal is at a first logic level while the selection signal is at the first logic level, when the plurality of pixels output the reference signal.

2. The image sensor as claimed in claim 1, wherein the reference signal corresponds to the pixel signal generated when the pixel array does not receive light.

3. The image sensor as claimed in claim 1, further comprising:
a sample-and-hold circuit to receive the reference signal and the pixel signal from the pixel array, and to sample and transmit the reference signal and the pixel signal to the column signal processor.

4. The image sensor as claimed in claim 1, wherein:
the reference signal is output from at least one first pixel row in the pixel array, and
the pixel signal is output from a plurality of second pixel rows different from the first pixel row in the pixel array.

5. The image sensor as claimed in claim 4, wherein the at least one first pixel row outputs the reference signal for each frame.

6. The image sensor as claimed in claim 4, wherein the at least one first pixel row outputs the reference signal at a same time.

7. The image sensor as claimed in claim 4, wherein the reference signal and the pixel signal are output from same pixel rows in the pixel array.

8. The image sensor as claimed in claim 1, wherein the column mismatch compensator comprises:
a first block to generate reference column fixed pattern noise (CFPN) data based on the reference CDS signal, and to generate pixel data based on the pixel CDS signal;
a second block to store the reference CFPN data or the pixel data; and
a third block to compensate the pixel data based on the reference CFPN data.

9. The image sensor as claimed in claim 8, wherein the third block outputs compensation data based on a difference between the pixel data and the reference CFPN data.

10. The image sensor as claimed in claim 1, wherein the reset signal is at a second logic level while the selection signal is at the first logic level, when the plurality of pixels output the pixel signal.

11. The image sensor as claimed in claim 1, wherein the reset signal is at a second logic level while the selection signal is at a first logic level, when the plurality of pixels output the reference signal.

12. A method of processing an image, the method comprising:
generating a reference signal from at least one pixel in a pixel array during a reference measuring time;
generating a reference correlated double sampling (CDS) signal by performing CDS on the reference signal;
generating a pixel signal from the pixel array during a pixel measuring time different from the reference measuring time, the at least one pixel to receive light during the pixel measuring time;
generating a pixel CDS signal by performing CDS on the pixel signal;
compensating the pixel CDS signal based on the reference CDS signal;
controlling a plurality of pixels in each of at least one pixel row based on a transfer signal, a reset signal, and a selection signal, each of the pixels including the at least one pixel comprising:
a photodiode to receive light and generate photocharges;
a transfer transistor connected to the photodiode to transfer the photocharges based on the transfer signal;
a floating diffusion node to accumulate the photocharges transferred through the transfer transistor;
a reset transistor to discharge the photocharges from the floating diffusion node based on the reset signal;

a source follower transistor to amplify and convert the photocharges in the floating diffusion node into a voltage signal; and a selection transistor to selectively output the voltage signal based on the selection signal, and the reset signal and the selection signal are simultaneously activated during the reference measuring time, wherein the reset signal is at a first logic level while the selection signal is at the first logic level, when the plurality of pixels output the reference signal.

13. The method as claimed in claim 12, wherein the reference signal corresponds to the pixel signal generated when the pixel array does not receive light.

14. The method as claimed in claim 12, wherein the reset signal is at a second logic level while the selection signal is at the first logic level, when the plurality of pixels output the pixel signal.

* * * * *